US010877873B2

(12) United States Patent
Richardson et al.

(10) Patent No.: US 10,877,873 B2
(45) Date of Patent: Dec. 29, 2020

(54) USING HISTORIC EXECUTION DATA TO VISUALIZE TRACEPOINTS

(71) Applicant: Microsoft Technology Licensing, LLC, Redmond, WA (US)

(72) Inventors: Leslie Yvette Richardson, Seattle, WA (US); Jackson Michael Davis, Carnation, WA (US); Thomas Lai, Redmond, WA (US); Del Myers, Seattle, WA (US); Patrick Lothian Nelson, Redmond, WA (US); Jordi Mola, Bellevue, WA (US); James M. Pinkerton, Kirkland, WA (US); Andrew R. Sterland, Issaquah, WA (US); Andrew Joseph Luhrs, Sammamish, WA (US); Timothy Gardner Misiak, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/270,034

(22) Filed: Feb. 7, 2019

(65) Prior Publication Data
US 2020/0257615 A1    Aug. 13, 2020

(51) Int. Cl.
*G06F 11/36* (2006.01)
(52) U.S. Cl.
CPC ...... *G06F 11/3664* (2013.01); *G06F 11/3688* (2013.01)
(58) Field of Classification Search
CPC .......................... G06F 11/3664; G06F 11/3668
See application file for complete search history.

(56) References Cited

U.S. PATENT DOCUMENTS 5,870,607 A    2/1999 Netzer
6,901,581 B1   5/2005 Schneider
(Continued)

FOREIGN PATENT DOCUMENTS

WO    2018071450 A1    4/2018

OTHER PUBLICATIONS

"Non Final Office Action Issued in U.S. Appl. No. 16/258,291", dated Dec. 30, 2019, 21 Pages.
(Continued)

*Primary Examiner* — Wei Y Zhen
*Assistant Examiner* — Amir Soltanzadeh
(74) *Attorney, Agent, or Firm* — Workman Nydegger

(57) ABSTRACT

Techniques are provided to use historic execution state information to visualize tracepoint data. For example, historic execution state information corresponding to an application's previous execution is accessed. This historic execution state information was collected while the application was executing. After correlating the historic execution state information to the application's code, a tracepoint is associated with a portion of the code. Consequently, when the code is replayed based on the historic execution state information, the tracepoint causes a behavior of that code portion to be logged while the code is replayed uninterrupted. The code is then actually replayed based on the historic execution state information. During the replay, the tracepoint causes the behavior of the code portion to be logged. The logged behavior is visualized on a user interface.

20 Claims, 18 Drawing Sheets

100

(56) References Cited

U.S. PATENT DOCUMENTS

| | | | |
|---|---|---|---|
| 7,464,373 B1* | 12/2008 | Yunt | G06F 8/10 717/125 |
| 8,442,941 B2 | 5/2013 | Yao et al. | |
| 9,092,332 B2 | 7/2015 | Taylor et al. | |
| 9,898,385 B1 | 2/2018 | O'Dowd et al. | |
| 9,959,194 B1 | 5/2018 | Mola | |
| 10,120,781 B2 | 11/2018 | Hu et al. | |
| 10,133,653 B2 | 11/2018 | O'Riordan et al. | |
| 10,509,694 B2 | 12/2019 | Sivalingam et al. | |
| 2010/0125834 A1 | 5/2010 | Matic | |
| 2010/0299655 A1 | 11/2010 | Heisch et al. | |
| 2012/0185430 A1 | 7/2012 | Yao et al. | |
| 2014/0331092 A1 | 11/2014 | Taylor et al. | |
| 2015/0143344 A1 | 5/2015 | Davis | |
| 2015/0378870 A1 | 12/2015 | Marron et al. | |
| 2016/0292061 A1* | 10/2016 | Marron | G06F 11/362 |
| 2018/0024911 A1 | 1/2018 | Kruszewski et al. | |
| 2018/0101466 A1 | 4/2018 | O'Dowd et al. | |
| 2018/0300197 A1 | 10/2018 | Marron | |
| 2018/0373581 A1 | 12/2018 | Sivalingam et al. | |
| 2019/0213355 A1 | 7/2019 | Raviv et al. | |
| 2019/0266068 A1* | 8/2019 | Raviv | G06F 8/33 |
| 2019/0370148 A1 | 12/2019 | Du et al. | |
| 2020/0242007 A1 | 7/2020 | Davis et al. | |

OTHER PUBLICATIONS

Miraglia, et al., "Peeking into the Past: Efficient Checkpoint-Assisted Time-Traveling Debugging", In Proceedings of IEEE 27th International Symposium on Software Reliability Engineering, Oct. 23, 2016, pp. 455-466.

"International Search Report and Written Opinion Issued in PCT Application No. PCT/US2019/068451", dated Apr. 6, 2020, 16 Pages.

Final Office Action Issued in U.S. Appl. No. 16/258,291, dated Jun. 17, 2020, 21 Pages.

"International Search Report and Written Opinion Issued in PCT Application No. PCT/US20/015502", dated May 27, 2020, 14 Pages.

* cited by examiner

USING HISTORIC EXECUTION DATA TO VISUALIZE TRACEPOINTS

BACKGROUND

Tracking down and correcting undesired software behavior is a core activity in software development. Undesired software behavior can include many things, such as execution crashes, runtime exceptions, slow execution performance, incorrect data results, data corruption, and the like.

Undesired software behavior can be triggered by a wide variety of factors, such as data input, user input, race conditions (e.g., when accessing shared resources), and others. Given this wide variety of triggers, undesired software behavior can appear to be seemingly random; consequently, it can also be extremely difficult to reproduce. As such, developers often spend exorbitant amounts of time attempting to identify undesired software behavior. Once an undesired software behavior has been identified, it can again be difficult to determine its root cause(s).

Developers may take several approaches to identify undesired software behavior and to then identify the location(s) in an application's code that caused the undesired software behavior. For example, a developer might test different portions of an application's code against different inputs (e.g., unit testing), or they might reason about the execution of an application's code in a debugger (e.g., by setting breakpoints/watchpoints, by stepping through lines of code, and/or by observing the application's behavior in a profiler).

Additionally, or alternatively, a developer might insert diagnostic code into an application's code. Diagnostic code generates diagnostic information (e.g., logs) that can be used to identify program execution behavior. For example, diagnostic code might include trace statements that generate diagnostic information, such as variable value(s) at a given point in time, memory value(s) at a given point in time, an indication of when a function has been called, an indication of when a line of code has executed, or even an indication of when an iteration of a loop or other type of expression has executed.

Since execution of some diagnostic code can negatively impact application performance and since diagnostic information can consume large amounts of storage resources, developers are often selective about what diagnostic code is included (or made active) in an application that is to be deployed for production use. Additionally, while the information generated by diagnostic code can be very helpful, such code is often determined by a developer up-front and is added to an application's code prior to the application's deployment. Consequently, developers have been required to forecast, predict, or estimate where best to utilize diagnostic code.

If the diagnostic code in a deployed application does not generate the diagnostic information needed to identify a given undesired software behavior, or its root cause, then the developer may need to modify the diagnostic code in the application's code and re-deploy the application. Re-deployment can include recompiling the application, re-deploying the application to a server, or even restarting the application. For large applications and for applications that are in active production use, re-deploying those applications can be time consuming and/or disruptive. In addition, if the undesired software behavior is rare, it may take some time before the undesired software behavior is repeated after the application's re-deployment. While diagnostic code can be very useful in some cases, its use can be limited and/or inflexible in production environments. With that in mind, there is a need to improve how application code is debugged and there is a need to improve how developers interact with the debugging environment in order of find and resolve coding errors or other coding issues.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to computer systems, methods, and devices that use historic execution state information to visualize tracepoint data. In doing so, significant benefits may be achieved because an application's behavior can be more easily monitored, and refinements to the application's code can be made more efficiently and in a more flexible manner.

In some embodiments, historic execution state information is first accessed. This historic execution state information was collected during a previous execution, run, or exercise of an application. That is, the application was previously run and its state information was monitored during that run. As such, the historic execution state information was collected during an earlier time period as opposed to a current time period or a current execution. After correlating the application's historic execution state information to code associated with the application (e.g., by correlating specific instruction counts to specific items in the application's code, or to other code associated with the application such as third-party library code), a tracepoint is associated with a portion of the code. As an example, a "portion" of code may include an entire function/method/routine, a particular line of code, an individual variable, a particular expression, any other coding instance or object, or any other code associated with the application. Later, when this code is replayed based on the historic execution state information, the tracepoint causes a behavior of the code portion to be logged while the code is being replayed unimpededly (or without interruption). Eventually, the code is actually replayed based on the historic execution state information. During this replay, the tracepoint causes the behavior of the code portion to be logged. Additionally, this logged behavior is beneficially visualized on a user interface that has a unique format or layout.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
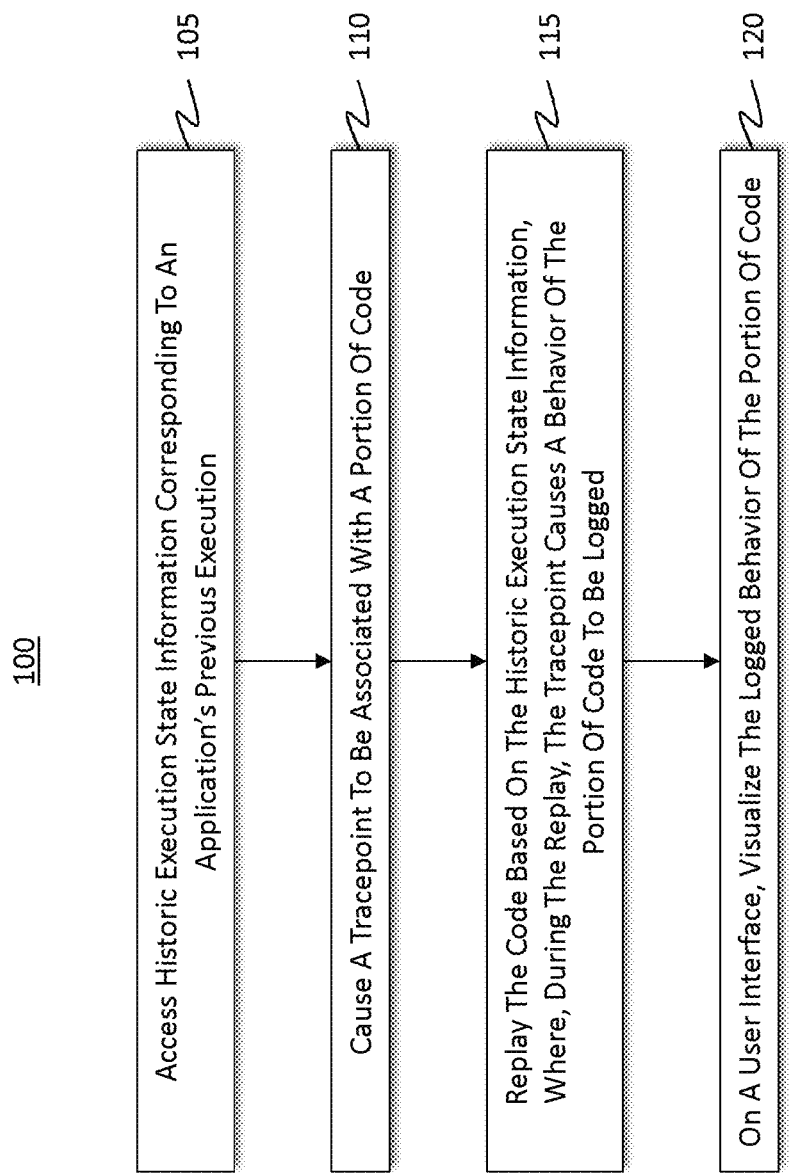
FIG. 1 illustrates a flowchart of an example method for using historic execution state information to visualize tracepoint data.

Disclosed embodiments relate to computer systems, methods, and devices that use historic execution state information to visualize tracepoint data.

In some embodiments, an application's historic execution state information is first accessed. After correlating the historic execution state information to the application's code, a tracepoint is associated with at least a portion of the code. This tracepoint causes a behavior of the code portion to be monitored and logged when the code is replayed based on the historic execution state information. Eventually, the code is replayed based on the historic execution state information. During this replay, the tracepoint causes the behavior of the code portion to be logged. Additionally, this logged behavior is visualized on a user interface.

As used herein, an application's "code" should be interpreted broadly to mean any type of code that is associated with an application. Examples include, but are not limited to, higher-level source code developed by a developer within a development environment, lower-level code resulting from compiling operations, or any other code that is used in executing, compiling, and/or debugging an application. From this, it will be appreciated that the disclosed embodiments are able to bind a tracepoint to a function which may or may not have source code (e.g., higher-level code developed by a human developer) or symbols available. Instead, that function may have other types of code associated with it (e.g., backend compilation code or any other type of execution instructions used to compile, execute, and/or debug code). In this regard, a mapping can be provided from a tracepoint to human developed source code or to any other type of code associated with an application.

Technical Benefits

The disclosed embodiments may be used to improve the current technology in a vast number of different ways. For example, by using the disclosed example user interface, a developer will be able to beneficially construct many different views or visualizations of an application's execution. These views can significantly improve how code that executes as part of an application is developed and debugged, especially during situations where the developer may not initially know where a bug or other coding issue is located in this code. That is, by using the disclosed user interface, a developer will be able to more easily and more efficiently locate and resolve any type of coding issue. Consequently, the disclosed embodiments substantially improve how a developer/user interacts with the computer system.

The disclosed embodiments also operate to improve how an application and/or a computer system operates. For instance, computers operate by executing executable code instructions that are part of an application. If that code has coding errors or inefficiencies, then the computer will not operate in a desired manner or it will not operate as efficiently as it otherwise might be able to. By practicing the disclosed principles, the disclosed embodiments can facilitate the identification and resolution of coding issues within a body/corpus of code. By locating these issues, they can then be resolved, and the computer can operate more efficiently. As such, the disclosed embodiments can be used to directly impact the operational performance of a computer system. Additionally, the disclosed embodiments are not limited simply to debugging scenarios. For instance, the disclosed embodiments can also be used to perform any kind of security auditing or other type of auditing operation. Accordingly, significant advantages may be realized by practicing the disclosed principles, as will be discussed in further detail below.

Example Method(s)

Attention will now be directed to FIG. 1 which refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed. The method presented in FIG. 1 is provided to introduce the disclosed embodiments while subsequent portions of the disclosure will more fully clarify different and/or additional aspects of the disclosed embodiments.

FIG. 1 illustrates a flowchart of an example method 100 for using historic execution state information to visualize tracepoint data. By way of introduction, a "tracepoint" is a debugging feature used to monitor at least a "portion" of code (e.g., source code and/or any other type of code associated with an application) without necessarily having to interrupt the execution of the code. Examples of a "portion" of code include, but certainly are not limited to, a function/module/routine, a line of code, a variable, an expression, or any other type of coding instance or object.

A "tracepoint" is somewhat distinct from a "breakpoint" because a breakpoint typically does cause the execution to pause, halt, or otherwise break. In some cases, a tracepoint can be considered to be a type of modified breakpoint in that a tracepoint can be configured to allow a developer to set one or more custom actions (e.g., monitor code behavior without pausing) and/or conditions (e.g., defining when the tracepoint is to be triggered) on the code. In some cases, tracepoints can be used for diagnostic purposes. As an example, a tracepoint, which can be considered a form of "diagnostic code," can be injected, hooked, or otherwise associated with an application's code. The diagnostic code can then assist in the process of identifying coding bugs, errors, or other inefficiencies. Tracepoints are, therefore, quite useful for inspecting any type of code behavior.

As a practical example, consider a scenario in which a developer desires to debug a function that is called numerous times (e.g., 5; 10; 15; 20; 100; 1,000; or more than 1,000 times). If a breakpoint were used in this scenario, then the execution would pause each time the function was called. While this pause might be acceptable in situations where the function was called only a relatively few number of times (e.g., 1, 2, 3, etc.), this pause would likely not be acceptable in situations where the function was called a relatively large number of times (e.g., 50; 100; 1,000; 2,000; etc.). As such, a tracepoint can be associated with the function in order to monitor the function's behavior without pausing/interrupting the execution when the function is called or executed. Tracepoints, therefore, can be beneficially used to monitor the behavior of any portion of code. As will be discussed in more detail later, a tracepoint can also cause some customizable action (e.g., a logging action or any other type of printf action) to be performed each time it is triggered (e.g., when the function is called or when a defined condition is satisfied). Example actions include, but are not limited to, logging a message to an output window; logging data to a buffer, queue, or log; or any other type of definable action.

With that understanding, attention will now be returned to method 100 of FIG. 1. Initially, method 100 includes an act 105 in which historic execution state information is accessed. In some cases, act 105 includes accessing historic execution state information corresponding to a previous execution of an application, where the historic execution state information was collected during a previous execution of an application. That is, the historic execution state information was collected while the application executed during at least one previous point in time as compared to a current point in time. It will be appreciated that the historic execution state information may be accessed from any source, including a local source or a remote source.

Figure 2A:
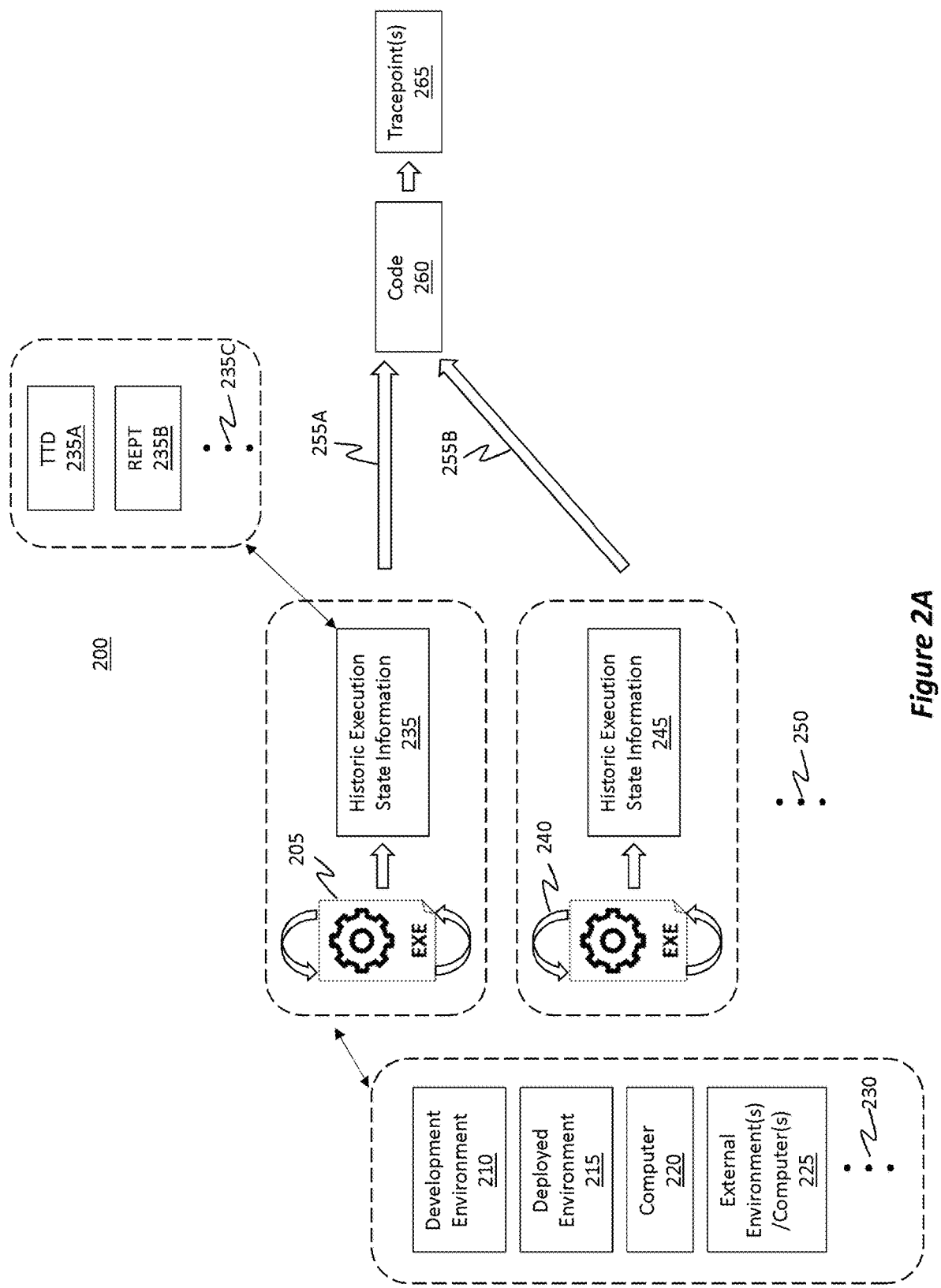
FIG. 2A illustrates an example flowchart of how historic execution state information may be collected from multiple entities, and at multiple different times, and an example of how the historic execution state information may be used in conjunction with one or more tracepoints.

FIG. 2A helps clarify act 105 of method 100. FIG. 2A shows an example scenario 200 in which an application 205 (e.g., consider the "exe" box), where application 205 is an example implementation of the application in method act 105, is executing. This execution can occur in any environment, can occur in multiple environments, can occur at any time, or can occur at multiple different times.

As an example, the execution can occur in a development environment 210 in which a developer is systematically working on developing/refining the application. In other cases, the execution can occur in a deployed environment 215 in which the application has already been delivered to a client and is in production use. Accordingly, in some embodiments, the historic execution state information was collected while the application was in at least one of a deployed state or a development state.

In some cases, a single local computer 220 performs the execution while in other cases one or a combination of multiple external computing environments or computer systems 225 are performing the execution. Accordingly, the historic execution state information in method 100 may have been collected when the application was in a deployed state, a development state, or any of the other scenarios presented in FIG. 2A. The ellipsis 230 shows that the application's execution can occur in other places, times, or environments and that the execution is not limited to that which is shown in FIG. 2A.

As described earlier in method act 105, during the execution of application 205, historic execution state information 235 is also collected. This historic execution state information 235 is information describing operational state of the application 205 as the application 205 was executing. For instance, this information may include, but certainly is not limited to, any data stored in a processor's cache or registers (while the application 205 was executing); any data stored in memory or memory buffers; any data associated with any read or write operations on a disk, over a network, or over any kind of input/output ("I/O") devices; and/or any other information describing the execution state of application 205. In this regard, the disclosed embodiments provide the ability to dynamically monitor an application in order to collect historic execution state information 235 at one or more points in time. As used herein, this dynamic monitoring is generally categorized as "historic debugging technologies."

More specifically, historic debugging technologies record the execution state of one or more threads (or cores, processors, registers, and so forth) at various times in order to enable a later execution of those threads based on the same recorded execution state. The term "replay" refers to this later execution. The fidelity of that replay execution varies depending on what recorded execution state is available, and could vary from replay from a single point in time (e.g., based on a single snapshot of historic execution state) to a "bit-accurate" repay that continuously supplies executing instructions with a continuously-recorded historic execution state.

For example, one class of historic debugging technologies, referred to herein as "time-travel debugging" (TTD), records a bit-accurate trace of a thread's execution. The trace can then be used to later faithfully "replay" that thread's prior execution down to the fidelity of individual code instructions. In general, bit-accurate traces record a sufficient amount of information to reproduce initial processor state for at least one point in a thread's prior execution (e.g., by recording a snapshot of processor registers), along with data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology is referred to herein as "branch trace debugging," also called "REPT" debugging. This technique relies on reconstructing at least part of a thread's execution based on working backwards from a memory dump or memory snapshot (e.g., a crash dump). The technique also relies on a branch trace (or program flow trace), which includes a record of which execution flow branches were taken/followed during a period of time preceding the dump or snapshot. This technique starts with values (e.g., memory and register) from the dump or snapshot. Then, using the branch trace to partially determine code execution flow, the technique iteratively executes the thread's code instructions. This iterative execution includes executing backwards and/or forwards in order to reconstruct intermediary data values (e.g., register and memory) used by this code. This backward and forward iteration occurs until the values reach a steady state. Some embodiments operate using just a program flow trace. As a brief example, some of the disclosed user interfaces provide a claim coverage indication (e.g., later discussed in connection with FIGS. 11-13). This coverage comparison can be performed using only program flow data as opposed to additionally using snapshot or memory dump data.

Yet another class of historic debugging technology is referred to herein as "replay and snapshot debugging." This technique periodically records full snapshots of a thread's memory space and processor registers while the thread executes. If the thread relies on data from sources other than the thread's memory, or from a non-deterministic source, a record of those sources may also be generated along with the snapshots. This technology then uses the snapshot data to replay the execution of the thread's code between snapshots.

As used herein, historic debugging technology can also encompass technologies that take a snapshot of a "live" thread (e.g., by taking a snapshot of the thread's registers and memory space), and that then virtually execute the thread within the snapshotted memory space while the original live thread to continues execute uninterrupted within its original memory space. In this context, the historic execution state information comprises this snapshot, and the virtual execution of the thread from the snapshot comprises a "replay" of that process from the historic execution state information 235.

Accordingly, with regard to collecting the disclosed historic execution state information (e.g., historic execution state information 235 in FIG. 2A), any kind or type of historic debugging technology may be used. Furthermore, the collected historic execution state information can be stored or warehoused in any kind of repository or storage device.

FIG. 2A shows how the historic execution state information 235 may be collected using a time-travel debugging technique 235A or a REPT debugging technique 235B (e.g., using data acquired from a memory dump). The ellipsis 235C symbolically shows how any historic debugging technology may be used to generate the historic execution state information 235. In this regard, the embodiments can be monitoring/tracing technique agnostic with regard to how the historic execution state information 235 is generated. Accordingly, in some embodiments, the historic execution state information comprises at least one of time travel diagnostic data or data acquired from a memory dump.

As indicated earlier, once the historic execution state information 235 is generated, it can be stored anywhere, such as on a local machine or at a remote location/repository. The data is structured so that it can be accessed by whichever machine is tasked with performing the disclosed operations. Such access includes any necessary permissions.

In some implementations, the same application 205 can be executed by multiple different entities at multiple different or simultaneous time periods. For instance, execution 240 symbolically shows how the same application (e.g., the same "exe" block) can be executed by an entirely different entity or even by the same entity but at a different time period. During execution 240, a different set of historic execution state information 245 is collected. Depending on what occurred during execution 240, the historic execution state information 245 may be substantially similar to the historic execution state information 235. In other cases, however, the historic execution state information 245 may be quite different than the historic execution state information 235, even though the same application was executing.

As an example, if different execution branches were followed during execution 240 (e.g., as a result of different user input being entered or as a result of other circumstances such as differences in computing environment), then historic execution state information 245 will include at least some differences as compared to historic execution state information 235. The ellipsis 250 shows how the same application 205 may be executed any number of times by any number of different entities and how any number of different sets of historic execution state information (e.g., 235 and 245) may be generated based on those different executions. As examples only, there may be 1 set, 2 sets, 5 sets, 10 sets, 100 sets, 1,000 sets, or more than 1,000 sets. Any number of execution sets may be provided. It will also be appreciated that the historic execution state information 245 (just like historic execution state information 235) can be stored at a location accessible by the machine tasked with performing the disclosed operations.

In some instances, the historic execution state information 235 and 245 are generated for only a portion of the application's execution as opposed to an entirety of the application's execution. That is, in some cases, the historic execution state information includes information for only a portion of the application's execution as opposed to an entirety of the application's execution. For example, FIG.

2B shows a time period corresponding to the application's entire execution 270. In a first instance, a portion (e.g., see monitor application 275) of the application's execution 270 is monitored to collect the historic execution state information. Later, a second portion (e.g., see monitor application 280) of the application's execution 270 is monitored to collect additional or supplementary historic execution state information. The factors used to determine which portions of the application's execution are recorded can vary. Examples include wall-clock time (e.g., certain times of the day, repeating time intervals, a percentage of execution time, etc.), execution of particular code (e.g., corresponding to an identified function, module, class, etc.), execution of a first-party code versus third-party code (e.g., libraries), execution of user-mode code versus kernel-mode code, etc.

In this regard, one or more portions of the application's overall/entire execution can be monitored to collect the historic execution state information. In other cases, however, the entirety of an application's execution 285 can be monitored (e.g., see monitor application 290) to collect the historic execution state information.

Before a tracepoint can be associated with (or tagged to) the code, it is beneficial to first correlate the application's historic execution state information to the application's code. This correlation may occur in any number of different ways. For example, the correlation may occur by matching or otherwise associating specific program/processor instruction counts/operations (e.g., corresponding to specific line items in the source code or any other type of code) with specific portions of the collected historic execution state information 235 and 245. In this regard, specific data portions included within the historic execution state information 235 and 245 are identified as corresponding to specific line items or expressions of the application's code 260. FIG. 2A symbolically shows this correlation via arrows 255A and 255B between the application's code 260 and the historic execution state information 235 and 245.

Returning to FIG. 1, after the correlation occurs, then method 100 includes an act 110 in which a tracepoint is associated with a portion of the code. That is, in some embodiments, after correlating the application's historic execution state information to code of the application, act 110 includes causing a tracepoint to be associated with a portion of the code. In some cases, when the code of the application is replayed based on the historic execution state information, the tracepoint causes a behavior of the portion of the code to be logged while the code is replayed uninterrupted based on the historic execution state information. In some embodiments, the tracepoint is associated with a code location. Examples of a code location include, but are not limited to, a line of code, a statement in a line of code (e.g., a condition in a for loop), and so on. In some embodiments, the disclosed operations may be performed on lower level type of code, such as assembly code. Accordingly, while many of the figures use source code as an example, the disclosed embodiments are not limited only to source code. Indeed, the disclosed principles are operable on any type of code, source statements, and even code that does not have source code access. Depending on the context of the code, different visual or symbol formatting may also be used to identify code pieces. In some cases, the embodiments are operable without symbols or without source code access. In some cases, a tracepoint can be used to expose code that does not even exist in the source (e.g., expose underlying compilation APIs, third-party libraries, or other types of code).

FIG. 2A also shows how one or more tracepoints 265 may be associated with (or tagged to) the code 260, as described in method act 110 in FIG. 1. The process of tagging code with a tracepoint will be described in more detail later.

Figure 2B:
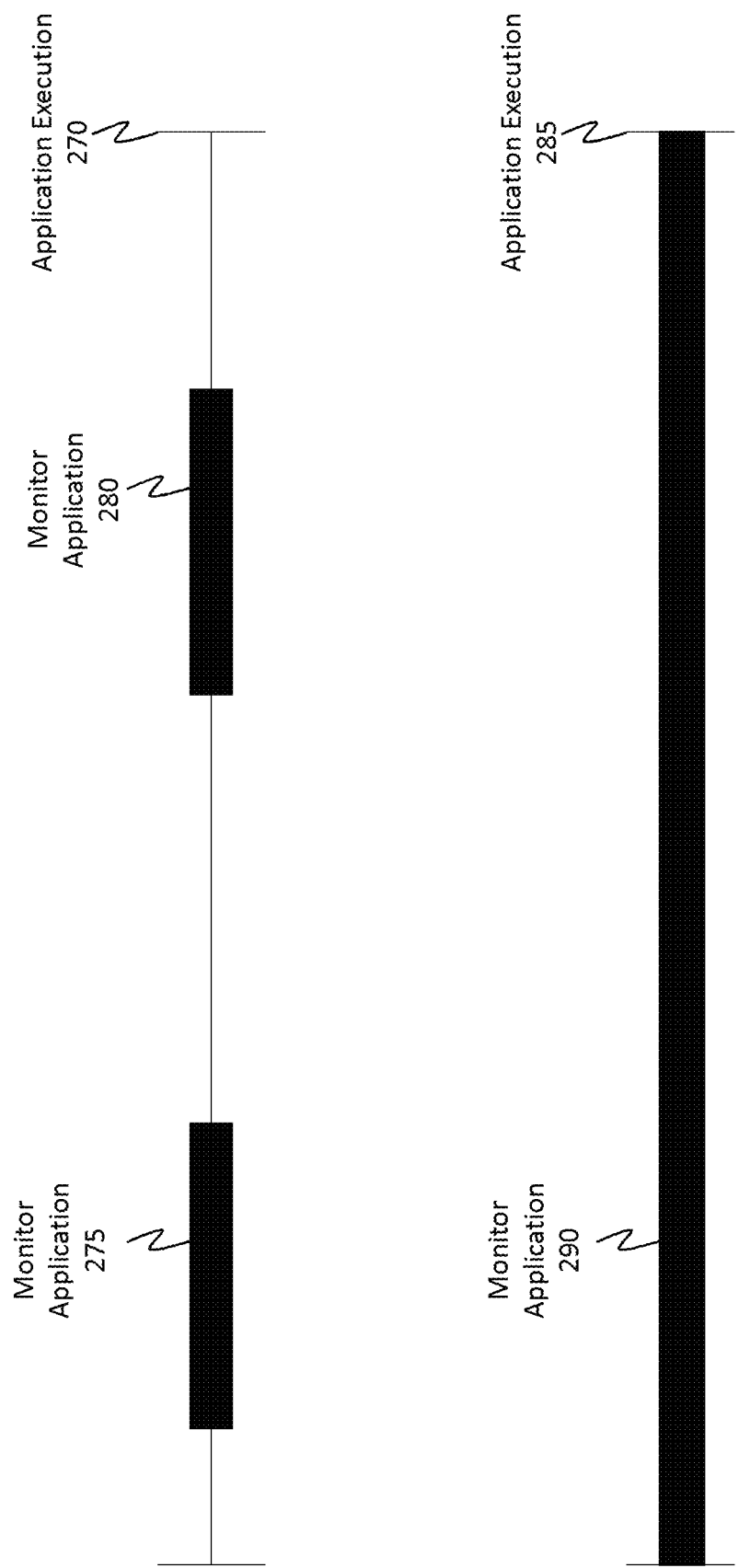
FIG. 2B illustrates an example of how an application can be monitored throughout different discrete time periods of its execution or, alternatively, throughout its entire execution duration.
Figure 2C:
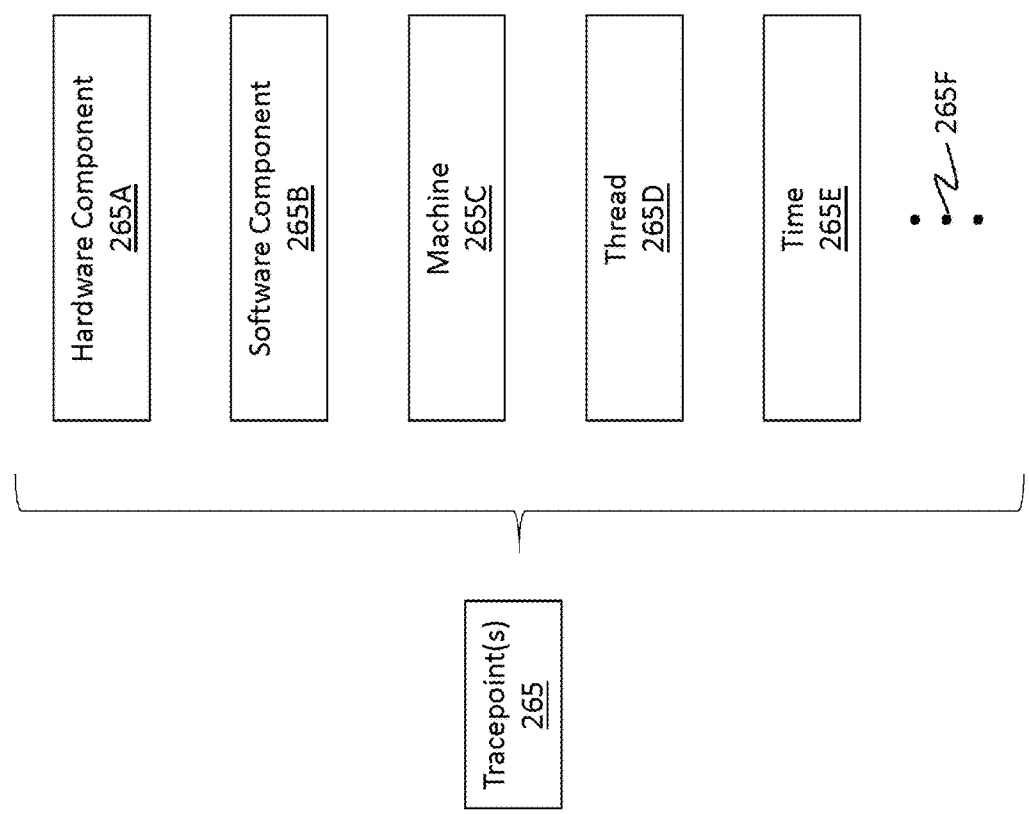
FIG. 2C shows examples of different techniques for configuring a tracepoint in order to collect behavioral data. For instance, by configuring the tracepoint in different ways, the resulting behavioral data (e.g., tracepoint data) can be organized based on hardware components, software components, machines, threads, or even based on different time periods.

A tracepoint 265 can be configured or otherwise customized in different ways in order to influence or define which behavioral data is to be collected. Further detail on "behavioral data" will be provided later, but as a brief introduction, this behavioral data can be organized in many different ways. For example, FIG. 2C shows that the tracepoint 265 can be used to define which behavioral data is to be collected. Based on the tracepoint definition(s), the behavioral data can be organized based on hardware components 265A (e.g., a particular core of a processor or any other hardware unit), software components 265B (e.g., a particular module, routine, variable, expression, etc.), machines 265C, threads 265D, or even based on different time periods 265E (as generally shown in FIG. 2B). The ellipsis 265F demonstrates that the behavioral data can be organized based on other factors as well and is not limited simply to that which is shown in FIG. 2C. Furthermore, in some embodiments, the tracepoint is configurable such that the logged behavior is organized by any one or more of hardware component, software component, machine, thread, or time.

Returning to FIG. 1, when the tracepoint (e.g., tracepoint 265) is tagged to or otherwise associated with the portion of code and when the code (e.g., code 260 in FIG. 2A) is "replayed" based on the historic execution state information (e.g., historic execution state information 235 and/or 245 in FIG. 2A), then the tracepoint causes a behavior of the code portion to be logged (i.e. behavioral data) while the code is replayed uninterrupted. That is, the tracepoint can be used to monitor application/program behavior without halting, pausing, or otherwise interrupting the application's execution when the tracepoint is encountered.

In this description and the claims, the term "replay" (also called "historic program execution") refers to any technique that executes one or more code instructions of one or more threads, based on data relating to a prior execution of those threads. A replay (or historic program execution) might leverage any of the previously described historic debugging technologies.

Generalizing, a replay operation need only rely on historic state of a thread at a single point in time (e.g., the information included in the historic execution state information 235 or 245). For example, as briefly mentioned, thread can be executed (i.e. "replayed") based on a single snapshot of that thread. Thus, for example, the historic debugging technologies used to collect the historic execution state information might create a snapshot of a live thread, and then (during replay) virtually execute the thread's instructions from that snapshot while the live thread continues to execute uninterrupted. In this regard, the embodiments are able to monitor how the application previously executed and compile the monitoring information to create the historic execution state information (e.g., 235 or 245). The historic execution state information can then later be replayed so as to simulate the operations that occurred when the application was previously executed.

In FIG. 1, method 100 is also shown as including act 115 in which the code is actually replayed based on the historic execution state information. In some cases, act 115 includes replaying the code based on the historic execution state information, where, during the replay, the tracepoint causes the behavior of the code portion to be logged. In will be appreciated that "source code" or also "code" could comprise machine code instructions and/or intermediate language (IL) instructions, and that replay of the source code could comprise replay of these machine code or IL instructions. Alternatively, "source code" or "code" could comprise statements written in a higher-level language, and that replay of the source code could comprise replay of machine code instructions or IL instructions that were compiled from the higher-level statements. Consequently, it is possible to bind a tracepoint to a function which may or may not have source code (e.g., higher-level code developed by a developer) available.

Figure 2D:
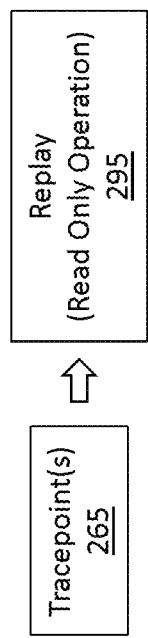
FIG. 2D shows an example of how a read-only replay operation may be performed in order to log the behavior of a particular portion of code (e.g., source code, compiled binary code, intermediate language code, etc.), which has been tagged or otherwise associated with a tracepoint.

FIG. 2D symbolically shows the operations of act 115. In particular, FIG. 2D shows how the tracepoint 265 can be used during a replay operation 295 in which the code (e.g., code 260 from FIG. 2A) can be replayed using the information included within the historic execution state information (e.g., 235 and/or 245 from FIG. 2A). FIG. 2D also shows how the replay operation 295 is a read-only operation performed by reading the historic execution state information (e.g., 235 and/or 245) as opposed to performing the actual side effects of the code. Accordingly, in some embodiments, replaying the code based on the historic execution state information is a read-only operation performed by reading the historic execution state information.

As an example, if the code performed any I/O operations on the computer system's disk or on the network, then those I/O operations would not actually be performed during the replay operation. Instead, those I/O operations would be performed in a virtual/simulated manner using the historic execution state information. Consequently, the tracepoint does cause the behavior of the portion of code to be monitored, but this monitoring actually occurs only after the application already previously executed. Stated differently, the behavior of the code portion is logged and visualized only after, or subsequent to, when the application previously executed. Accordingly, in some embodiments, the tracepoint is associated with the portion of code after the application's previous execution such that the behavior of the portion of code is logged and visualized only after the application's previous execution.

Returning to FIG. 1, method 100 also includes an act 120 of, on a user interface, visualizing the logged behavior of the portion of code. Some examples of different user interfaces will now be discussed in connection with FIGS. 3 through 9.

User Interfaces for Associating Tracepoints with Code Portions/Elements

Figure 3:
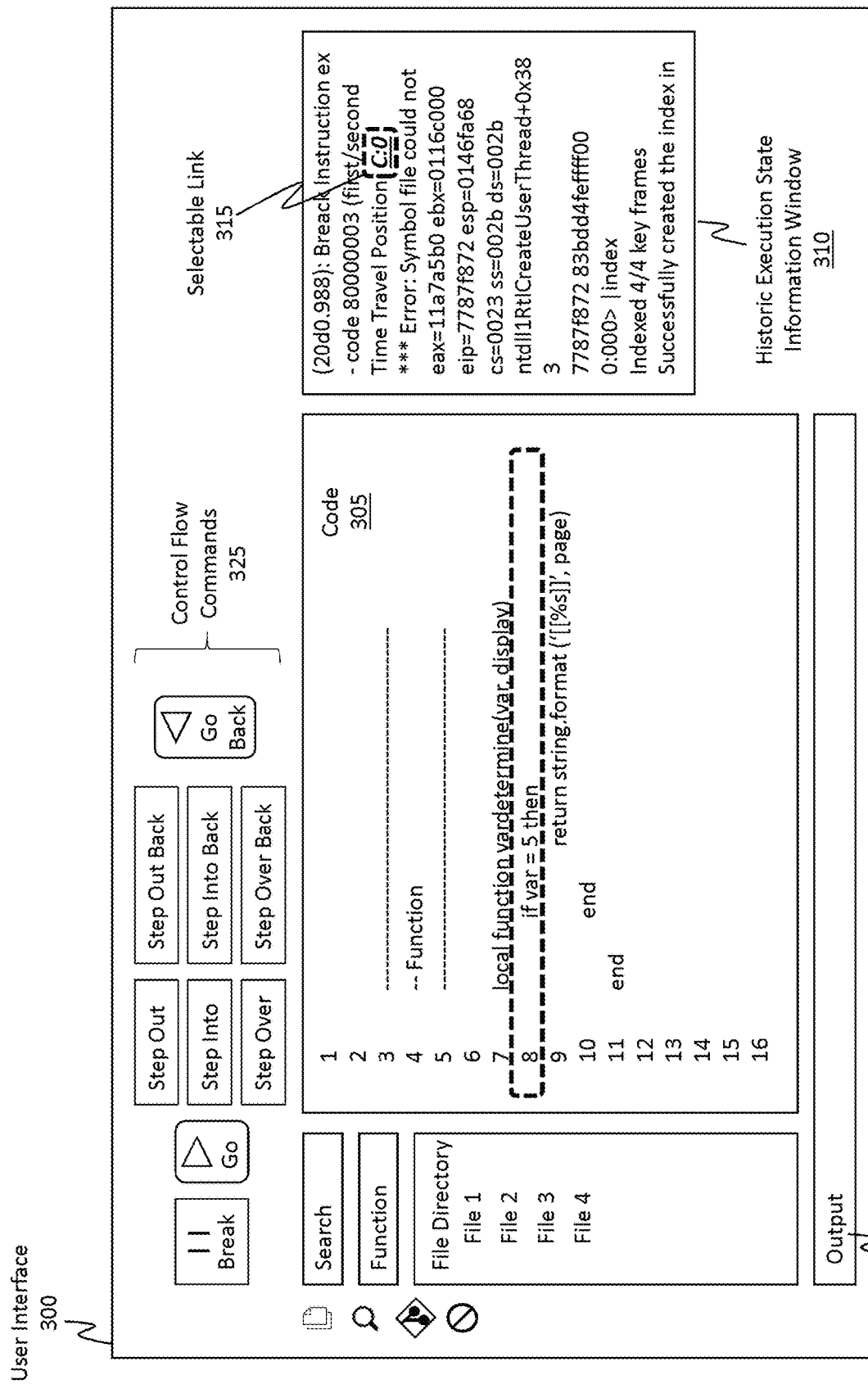
FIG. 3 illustrates an example user interface that simultaneously shows an application's code and the application's historic execution state information.

FIG. 3 shows an example user interface 300 that may be used to perform method act 120 in FIG. 1. It will be appreciated, however, that user interface 300 is simply one example implementation of a type of user interface and that the specific features, layout, and other visual artifacts included in user interface 300 are not limiting or otherwise binding. Accordingly, while frequent reference will be made to user interface 300 and to subsequent user interfaces, these references are used for example purposes only.

User interface 300 is in the form of an integrated development environment ("IDE"). Other types of user interfaces are available as well, however. Examples of these other types include, but are not limited to, program code text editors, code editors, debuggers, portals, and other development suites.

In this scenario, user interface 300 is displaying a body of code 305, such as that which was described in relation to method 100 of FIG. 1. Here, code 305 may be the machine code or IL instructions for an application that was previously executed in any type of execution environment (e.g., a deployed environment, a development environment, and so on), or the higher-level statements from which the machine code or IL instructions were compiled.

User interface 300 is also displaying a historic execution state information window 310 that includes historic execution state information, such as that discussed in the earlier figures. In some embodiments, the historic execution state information displayed in the historic execution state information window 310 includes any number of selectable links associated with specific state information. For instance, selectable link 315 is shown. If this selectable link 315 were selected by a user operating a cursor, then the user will be directed to the specific code portion that corresponds to the data associated with the selectable link 315.

For example, as generally described earlier in method act 110 of FIG. 1, specific portions of the historic execution state information are correlated with specific portions of the application's code. In the scenario shown in FIG. 3, the data associated with the selectable link 315 (e.g., the data reads: "Time Travel Position: C:0") is specifically associated with (i.e. correlated to) the expression provided in line 8 of the code 305. By selecting selectable link 315, the user will be directed to line 8. This direction may be performed in any number of ways. For instance, line 8 may be highlighted or its format may be modified, emphasized, or otherwise changed in some manner to provide a visual cue that the data of selectable link 315 is associated with line 8. In addition to highlighting, other types of cues include bolded text, italicized text, underlined text, color changes, and even circling (or bracketing in some manner). Additionally, or alternatively, after selecting selectable link 315, the cursor may be automatically moved to line 8. In this regard, a developer will be able to easily identify which portions of historic execution state information correlate with which portions of the code 305.

The historic execution state information displayed in the historic execution state information window 310 may include any amount or type of state information. As examples only, this information may include register values, memory addresses, memory read/write operation information, and so on. Accordingly, descriptions of the application's previous execution may be provided within the historic execution state information window 310.

As also shown, in some implementations, at least some, and potentially all, of the historic execution state information is displayed simultaneously with at least some, and potentially all, of the application's code 305. Such simultaneous display enables a developer to easily and intuitively connect/correlate the historic execution state information to the code 305. In some cases, there will be multiple different files of code 305 (e.g., user interface 300 shows a "file directory" with "File 1," "File 2," "File 3," "File 4," and so forth). In such cases, the embodiments can display particular portions of historic execution state information that specifically correlates with whatever code is currently being displayed, or vice versa (i.e. display code corresponding to the currently displayed historic execution state information).

User interface 300 also includes an output window 320. This output window 320 allows output of the code 305's execution to be visually displayed for a user to view and potentially interact with (e.g., the output may be selectable or otherwise interactive). For instance, when code 305 is replayed using its corresponding historic execution state information, then the resulting output of that replay execution can be displayed in the output window 320. More detail on this feature will be provided later.

User interface 300 also includes one or more different control flow commands 325 (also referred to herein as "playback controls"). In some cases, these control flow commands 325 include a break command, a go/execute command, a step out command, a step into command, and a step over command. These operations control a forward execution of the code 305.

Additionally, the control flow commands 325 may include a go/execute back command, a step out back command, a step into back command, and a step over back command. These back commands control a reverse execution of the code 305. In this regard, the user interface 300 enables a user to traverse the code 305 (through use of the historic execution state information) in both a forward direction and a reverse direction. Accordingly, in some embodiments, the user interface includes one or more playback controls, and where the one or more playback controls, when implemented, control how the logged behavior of a portion of code is visualized (e.g., by controlling the execution flow of the code 305). The different playback controls can also be used to control the visualization of the logged behavior of the code portion (e.g., by forward executing or reverse executing the portion of code, the changes in behavior can be visualized).

The user interface 300 may include other features as well. For instance, user interface 300 can include a search option which enables the user to search the code 305 and/or the historic execution state information. Additionally, user interface 300 may include any other debugging command or feature.

Figure 4:
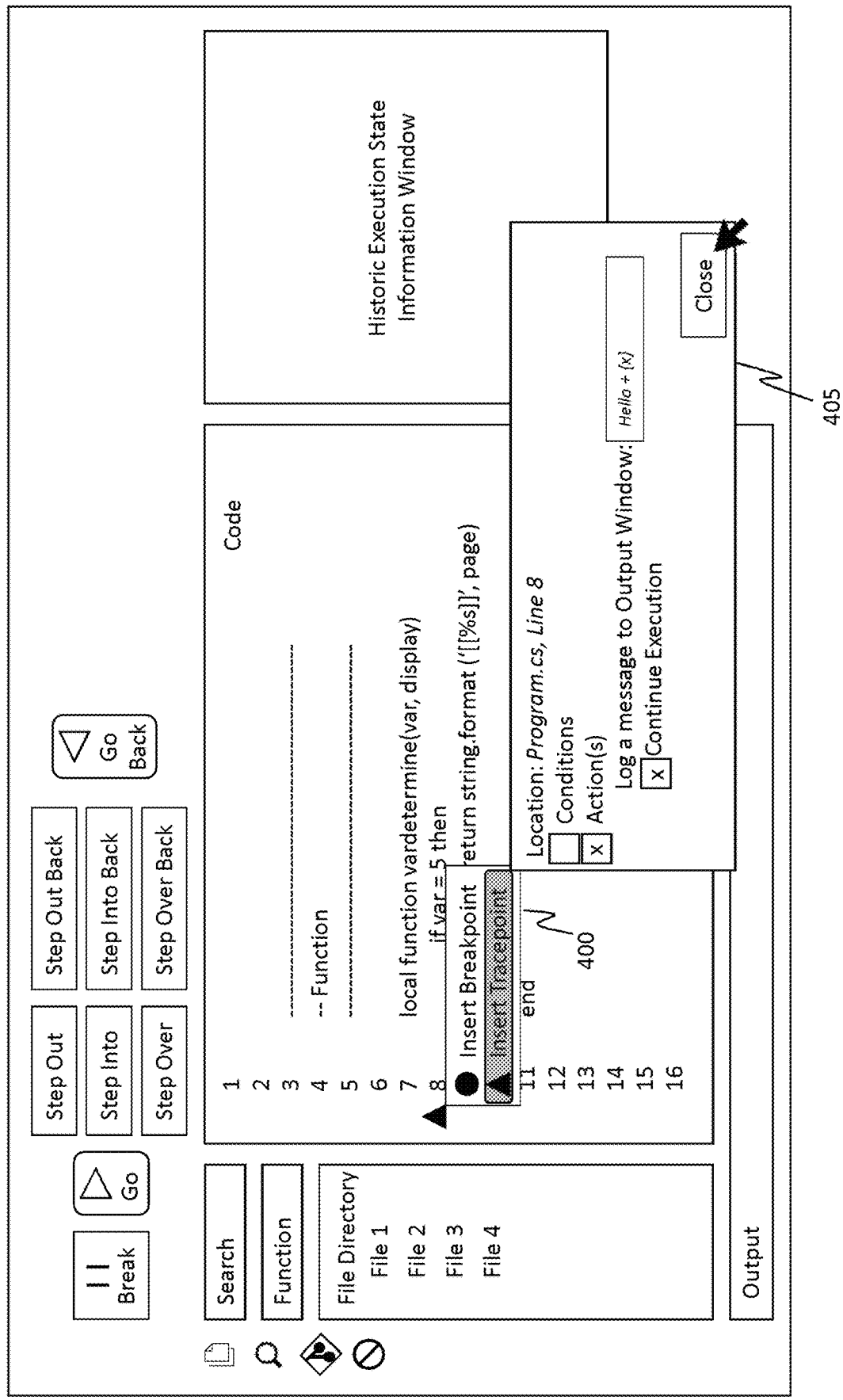
FIG. 4 illustrates an example of how a tracepoint can be associated with a portion of an application's code.

FIG. 4 shows another user interface that is similar to user interface 300 of FIG. 3. Because of these similarities, common interface elements will not be relabeled in this or subsequent figures.

As described earlier, a portion of code may be tagged with a tracepoint. FIG. 4 shows one example technique for tagging code with a tracepoint. Specifically, FIG. 4 shows a window 400 that may be used to tag code with a breakpoint and/or a tracepoint. Window 400 may be displayed by selecting (within the user interface) whichever coding element is desired to be tagged.

The visual appearance or format of a breakpoint icon (e.g., the circle in FIG. 4) is different than the visual appearance or format of the tracepoint icon (e.g., the triangle). This difference allows a developer is easily distinguish between tracepoints and breakpoints. Furthermore, by selecting a coding portion (e.g., a code line, an expression, or even a specific coding element such as a variable), a breakpoint or tracepoint may be associated with (or tagged to) that line, expression, or specific coding element.

In the context of FIG. 4, the user has elected to associate a tracepoint with line 8 of the code. When a tracepoint (or breakpoint) is associated with some portion of code, then the tracepoint's icon (e.g., the triangle) is visually embedded within the window that is displaying the code. The tracepoint icon may be displayed at a location proximate to the corresponding portion of code (e.g., the triangle is displayed next to the "8" of line 8). Accordingly, in some embodiments, a tracepoint icon is displayed at a location proximate to the portion of code, and the tracepoint icon has a format that is different from a breakpoint icon.

Although the tracepoint icon is shown next to a line number in FIG. 4, this is not the only location where a tracepoint icon may be displayed. For instance, in some implementations, the tracepoint icon may be visually embedded immediately proximate to a particular coding element such as a variable or parameter. As such, the embodiments are not limited to that which is shown in FIG. 4.

FIG. 4 shows that when the "Insert Tracepoint" option is selected in window 400, then another window 405 may be displayed. Window 405 shows a list or listing of customizable options that may be used to specially configure a tracepoint. To clarify, not all tracepoints need be configured in the same or similar manner. In some instances, multiple different tracepoints are associated with multiple different corresponding portions of code, where a corresponding behavior visualization for each tracepoint in the multiple different tracepoints is visualized on the user interface, and where each tracepoint is uniquely configured to log behavioral information or to perform some other customized operation/action.

Window 405 is shown as including a number of different features. Of course, these are just example features and should not be considered limiting. Window 405 lists the location where the current tracepoint is to be placed, or rather, which code element the tracepoint will be tagged to. For instance, next to the "Location" field, window 405 describes the placement location of the tracepoint as being "Program.cs, Line 8" where "Program.cs" corresponds to the file name of the current code and where "Line 8" corresponds to the specific code portion the tracepoint will be associated with.

In addition to visually displaying the location where the tracepoint will be tagged, window 405 also lists one or more different options for configuring/customizing the tracepoint. For instance, there is a "Conditions" option which can be used to specify when the tracepoint will be triggered to perform a definable action.

As one example and with reference to the code in line 8, the triggering condition for the tracepoint may be when the "var" value is equal to some value (e.g., "4"—an example value only). Consequently, when var=4, the tracepoint will be triggered to perform some definable action, which may also be defined within window 405. It will be appreciated that the tracepoint's triggering "condition" may be different and unrelated to any conditions or expressions included within the code (e.g., the condition could be that the tracepoint is to be triggered every $2^{nd}$, $3^{rd}$, $4^{th}$, $5^{th}$ etc. execution of the tagged code portion, or perhaps at specific time intervals, or perhaps when a specific hardware condition occurs). Accordingly, the tracepoint can be triggered in accordance with any defined condition. Additionally, or alternatively, the tracepoint can have an undefined default triggering condition in which the tracepoint is triggered simply when the tagged code portion is executed.

In FIG. 4, the "condition" field/option does not have a check (or "x") next to it. As such, the default trigger will be used, and this tracepoint will be triggered any time line 8 of the code is executed.

When the tracepoint is triggered, it will perform some action, as defined by the "Action" field in window 405. Here, the tracepoint action is to log a message to the output window. In this case, the logged message includes the expression "Hello+{x}." Furthermore, this particular tracepoint is configured so as to not pause, interrupt, or otherwise halt the execution of the code because the "Continue Execution" option has been selected. Accordingly, in this example scenario, each time line 8 of the code executes, the output window is to display "Hello" with the current value of "x." An example of this execution is shown in FIGS. 5A and 5B.

Figure 5A:
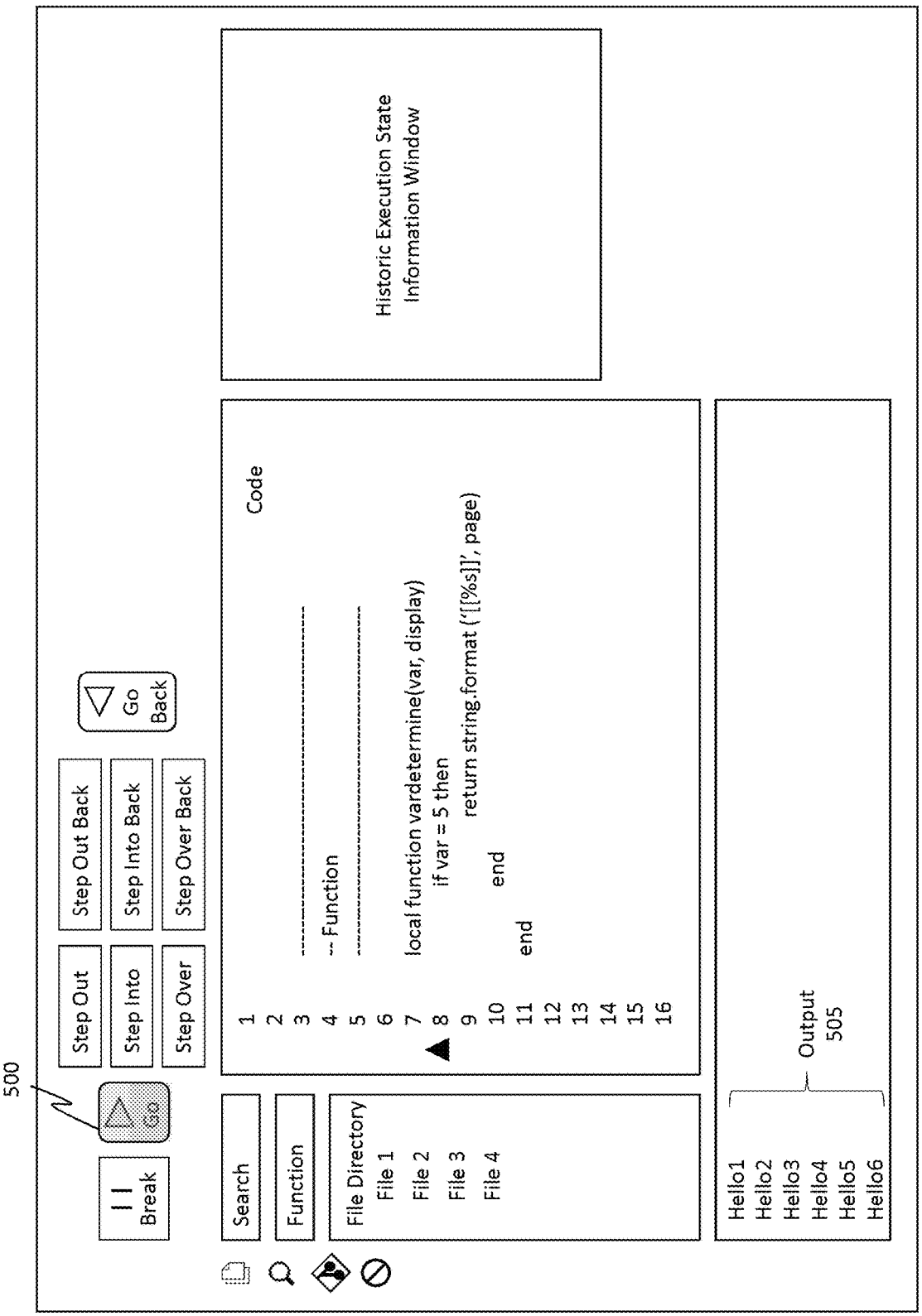
FIG. 5A illustrates an example of how, when a tracepoint is tagged or associated with a line of code and an example of how, when the code is replayed based on historic execution state information, a user interface can visualize the behavior of the tagged line of code.

In FIG. 5A, the user has pressed the Go playback control 500, thereby causing the code to be executed based on the historic execution state information. Each time line 8 executes, the output window generates a new line item of output 505. Currently, output 505 includes 6 entries (e.g., "Hello1," "Hello1," "Hello3," "Hello4," "Hello5," and "Hello6"). These output entries correspond to the defined action of the tracepoint, as shown in window 405 of FIG. 4. Additionally, the 6 output entries constitute the "behavior" of line 8 of the code. As such, the tracepoint being used to monitor the behavior of line 8, and that behavior is being visually displayed as the output 505.

In the scenario of FIG. 5A, the value of output 505 is a literal string value (e.g., "Hello1"), but that may not always be the case, as will be described in further detail later. Accordingly, by associating a tracepoint with a portion of code, the user interface can be used to visualize a behavior of that code portion. The six entries in output 505 correspond to a behavior of line 8 of the code.

Figure 5B:
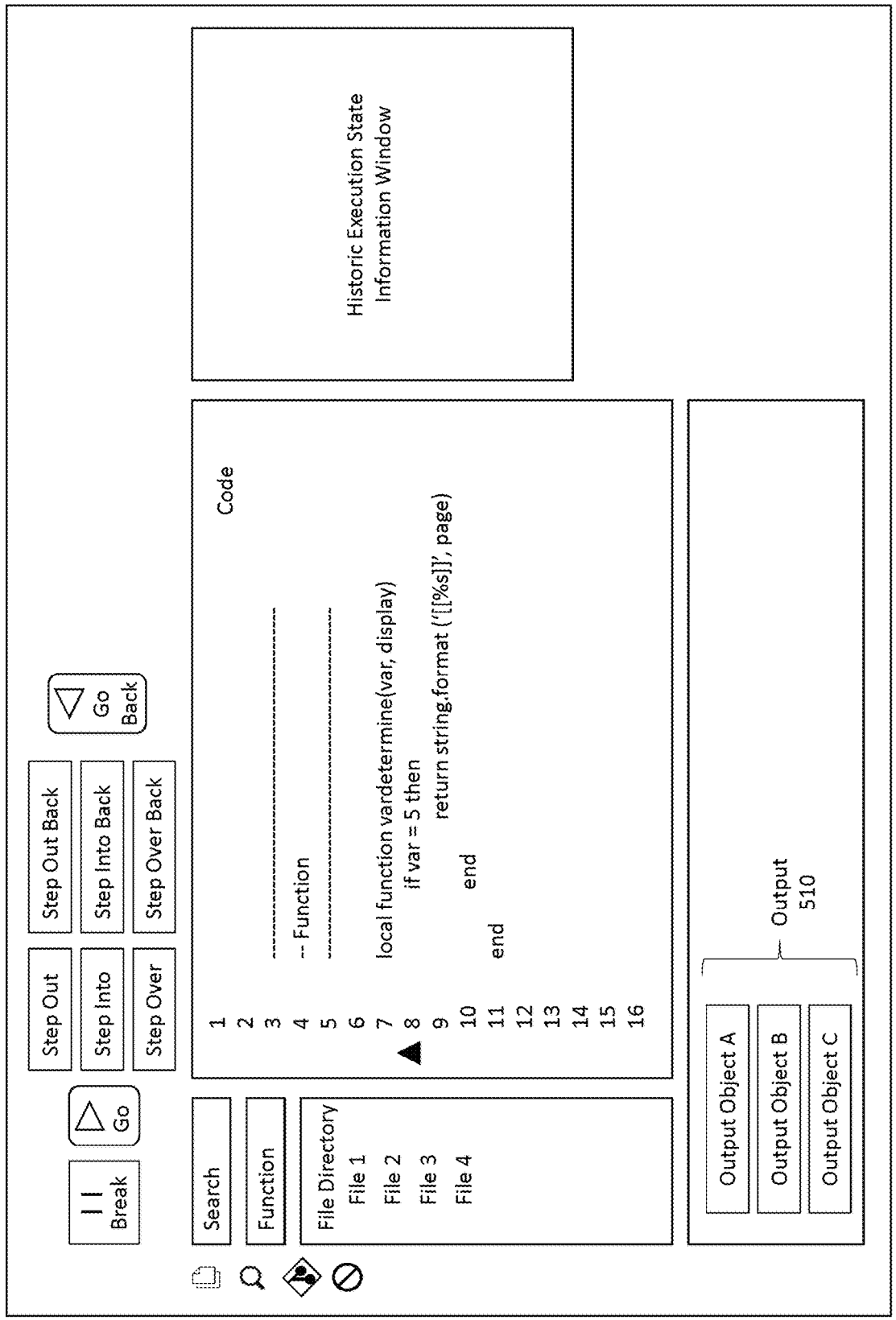
FIG. 5B shows an example of how logged behavior can be visualized using different output formats, such as an output object or even as a literal value.

FIG. 5B shows a slightly different scenario. In this case, the portion of tagged code (i.e. line 8) would normally produce a string output value (e.g., "Hello1" as shown in FIG. 5A). Here, however, one or more modifications have been made to the visualization of the logged behavior of line 8 in order to modify an output format of the visualized behavior. For example, instead of visualizing a literal string value, the visualization has been modified to now display the output in a different form (e.g., an "object" form), such as object outputs 510 (e.g., see "Output Object A," "Output Object B," and "Output Object C)". Therefore, while FIG. 5A visually displayed the logged behavior using string literals, other output formats can be used as well. Accordingly, in some embodiments, a portion of the code corresponds to a string value, and visualizing the logged behavior of the portion of the code is performed by visualizing the string value as an object or, alternatively, as a string literal.

Additional Visualizations of Code Element Behaviors

Figure 6:
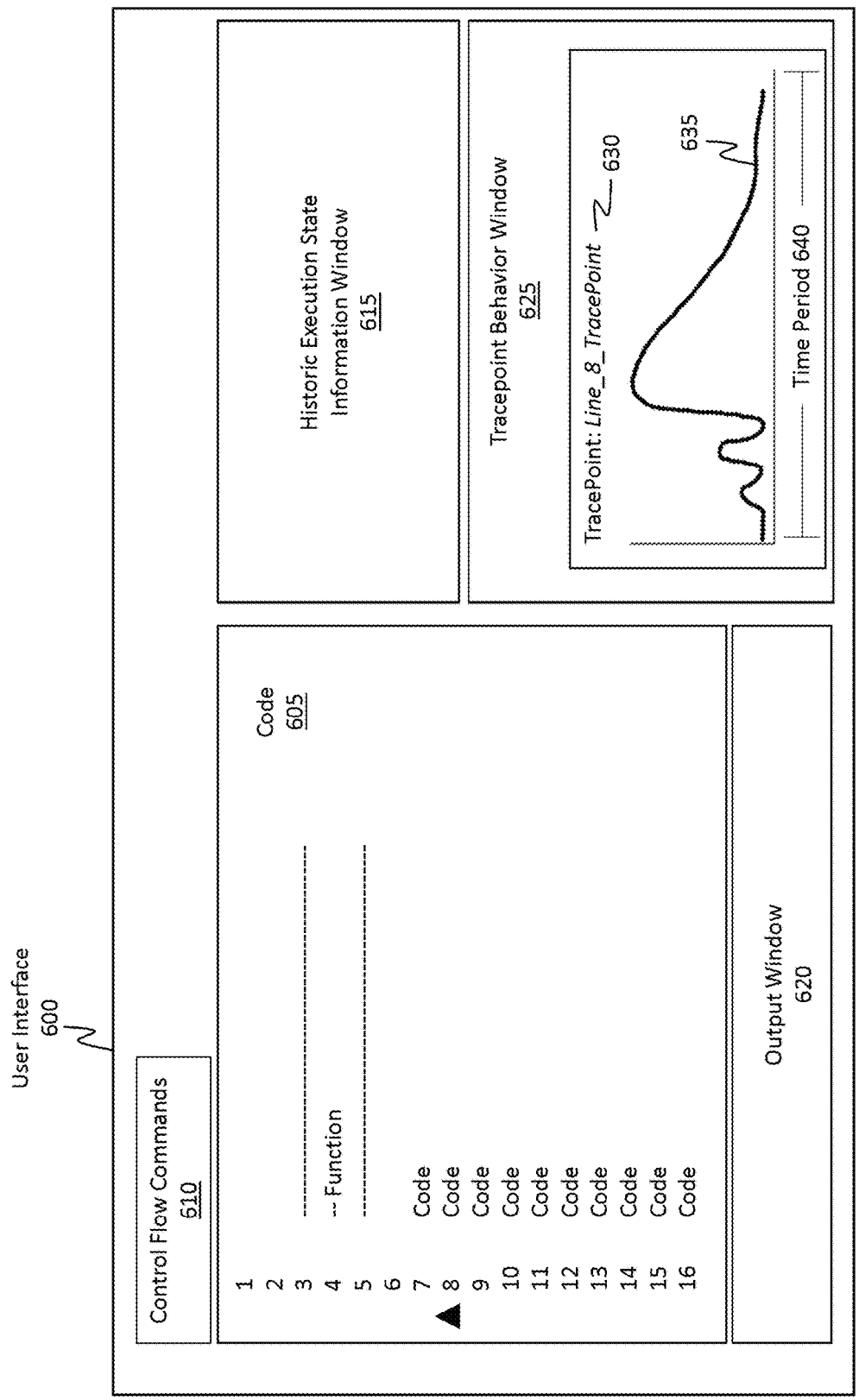
FIG. 6 illustrates an example user interface that graphically visualizes the logged behavior of a tagged line of code.

FIG. 6 shows another example user interface 600 which is similar to the previous user interfaces discussed thus far. User interface 600 also includes code 605, which is visually shown in a simplified form (e.g., simply the term "Code" is shown) as compared to the detailed form of code 305 from FIG. 3. The control flow commands 610, the historic execution state information window 615, and the output window 620 are also shown as having simplified forms. Additionally, a tracepoint has been associated with line 8 of code 605.

As a result of a tracepoint being associated with a code portion (e.g., line 8), user interface 600 is displaying a tracepoint behavior window 625. That is, in addition to the output window 620, the tracepoint behavior window 625 can also be used to visualize the logged behavior of different portions of the code 605, where the behavior is logged as a result of tracepoints being associated with those different code portions.

For instance, because a tracepoint is associated with line 8 of code 605, the tracepoint behavior window 625 visually illustrates the logged behavior of line 8. More specifically, the tracepoint behavior window 625 lists the name 630 of the tracepoint tagged to line 8, which name 630 reads as "Line_8_TracePoint." Additionally, tracepoint behavior window 625 includes a plot, chart, or graph 635 of the logged behavior over a determined period of time 640 (which can correspond to the time periods described in connection with FIG. 2B). Accordingly, in some embodiments, the process of visualizing the logged behavior (as described in method act 120 in FIG. 1) of a portion of code may include graphing the logged behavior over a determined period of time. Of course, other types of visualizations are available as well.

Additional visualization examples include, but are not limited to, bar charts, bubble charts, tables, interactive visualizations, histograms, pie charts, line charts, area charts, scatter plots, funnel charts, bullet charts, heat maps, box plots, mosaic charts, population pyramids, spider charts, trellis plots, function plots, trees, and hierarchy diagrams. With reference to FIG. 5A, the monitored behavior of line 8 shows that the code portion changed values from "Hello1" to "Hello2," then from "Hello2" to "Hello3," and so on. Thus, a visualization (e.g., graph 635) can visually illustrate these behavioral changes over time or over any other criteria (or function parameter).

Figure 7:
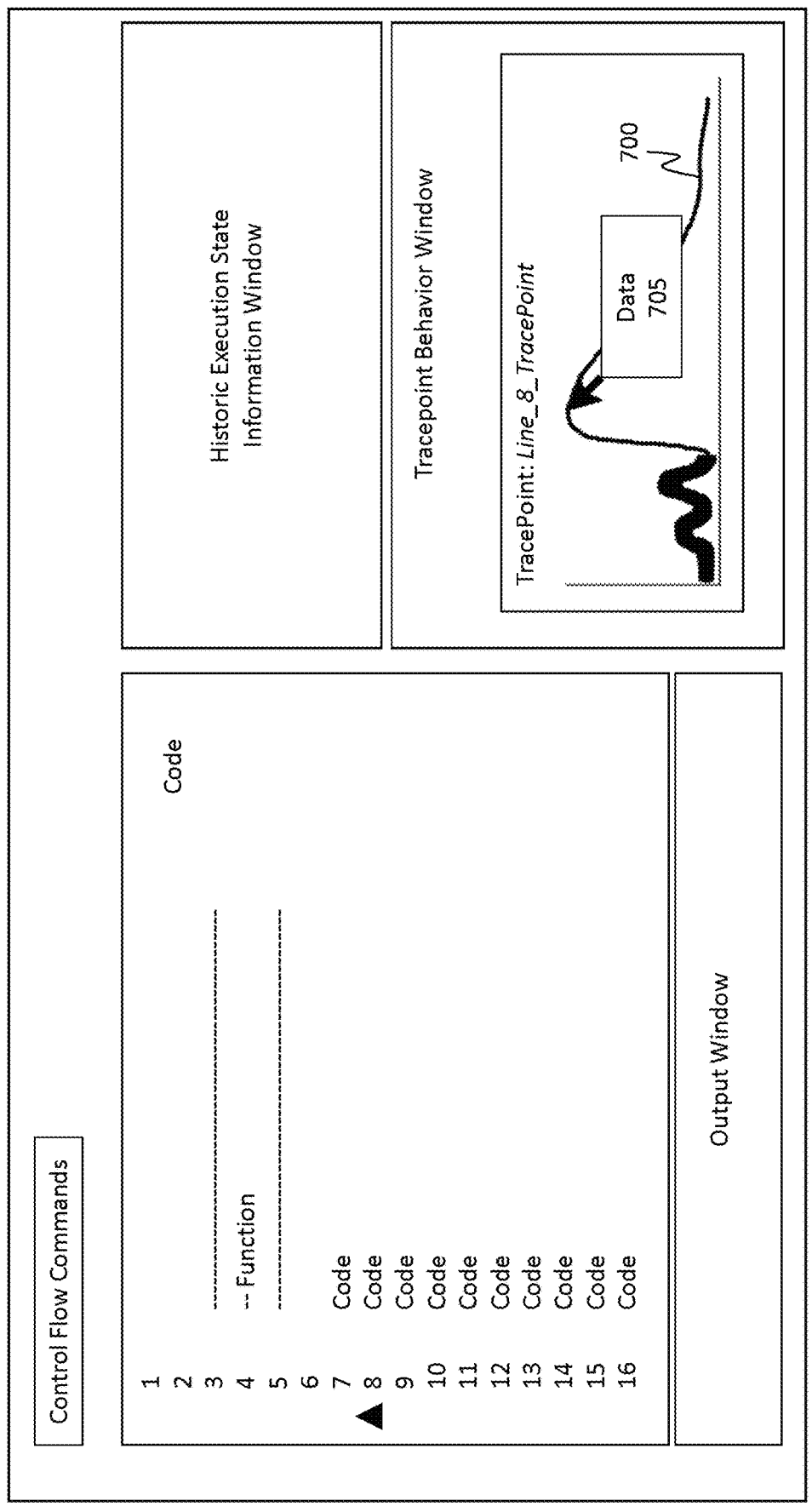
FIG. 7 shows an example of how a graph can visually illustrate the behavioral progression of a tagged line of code as that behavior changes over a period of time.

In some embodiments, the tracepoint behavior window (e.g., tracepoint behavior window 625 of FIG. 6) can illustrate the behavioral changes of the code in real-time as the code is being replayed based on the historic execution state information. For instance, FIG. 7 shows a user interface similar to that shown in FIG. 6. Here, however, the graph 635 is being progressively updated to correspond to the progressively changing behavior of line 8.

That is, over time, the behavior of the code in line 8 progressively changes (e.g., consider the peaks and valleys in the graph 700). Because the replay operation is being performed using already-recorded data, the entire logged behavior can be fully illustrated by the graph 700 and can be progressively filled in, or otherwise emphasized (e.g., highlighting, bolding, marking, etc.), to correspond with each behavioral change. For instance, the graph 700 shows two lines, one representing the entire logged behavior of line 8 (e.g., this line extends from the far left to the far right of the tracepoint behavior window) while the other line is progressively filling in the first line to correspond with each step of the replay execution operations (e.g., the second line is filled up to the second valley in the displayed graph). In this regard, the logged behavior can be progressively visualized while the code is being replayed (e.g., based on the historic execution state information) such that one or more behavioral changes (e.g., the peaks and the valleys in the graph 700) included within the logged behavior are rendered during the replaying operation.

In some embodiments, a cursor can also be hovered over any portion of the graph 700 to display data 705 corresponding to that specific area on the graph 700. For instance, in FIG. 7, the cursor is hovering over the third peak in graph 700, and data 705 is being visually displayed as overlapping a portion of the graph 700.

Multiple Tracepoints and Multiple Behavior Visualizations

Figure 8:
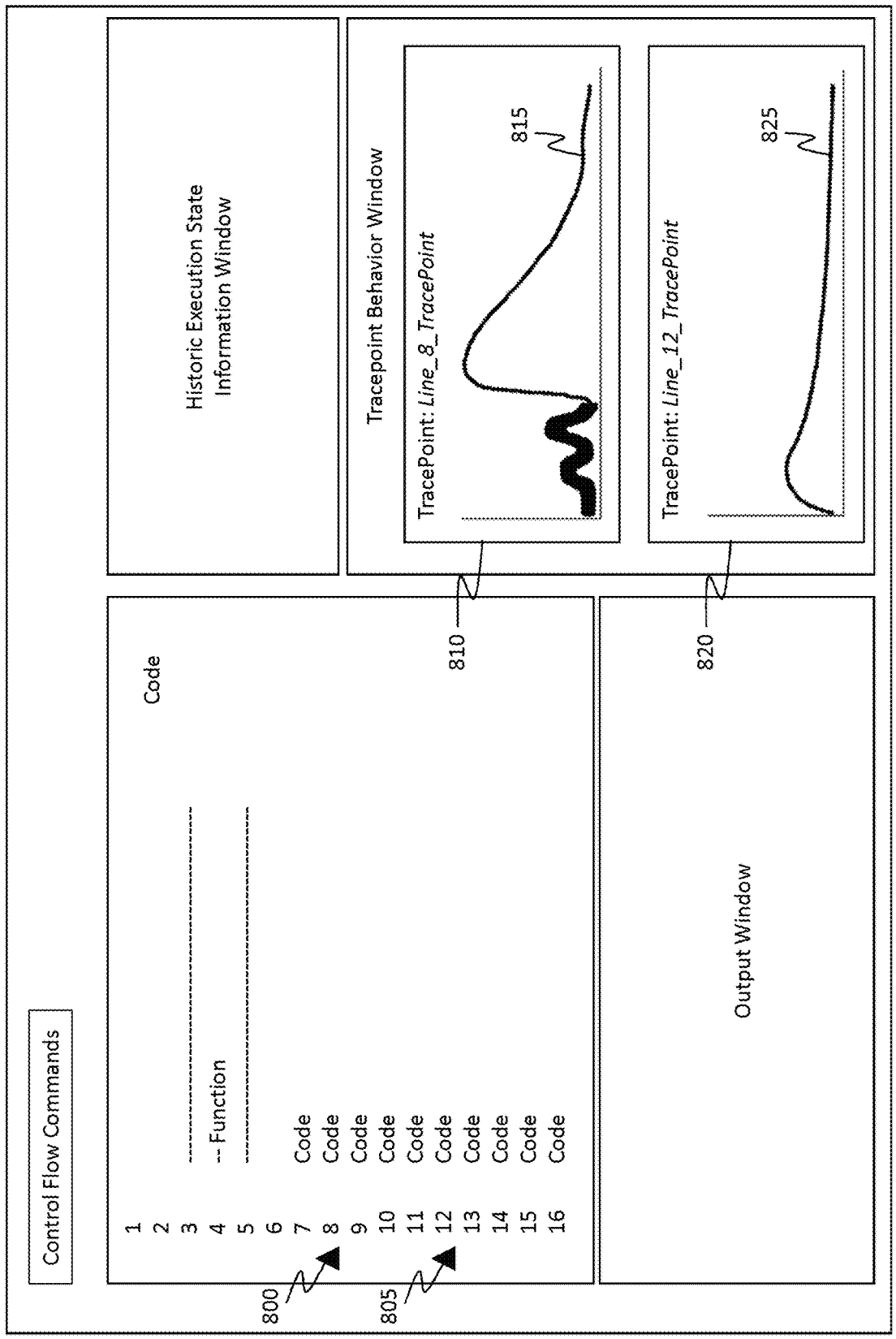
FIG. 8 shows an example of how multiple different tracepoints may be associated with (or tagged to) multiple different portions of code, and an example of how the behaviors of those different code portions can be visualized simultaneously with one another.

FIG. 8 shows a user interface in which multiple tracepoints (e.g., tracepoint 800 and tracepoint 805) have been associated with multiple different portions of code. For instance, tracepoint 800 is associated with line 8 while tracepoint 805 is associated with line 12. Similar to how the tracepoint was configured in FIG. 4, tracepoints 800 and 805 may be individually customized/configured to perform certain actions in response to one or more triggering events (e.g., the occurrence of a defined condition or even simply the execution of the corresponding line of code).

Because there are now multiple tracepoints, the tracepoint behavior window now also includes multiple sub-windows, with each window corresponding to one tracepoint. For instance, window 810 with its visualization (e.g., graph 815)

corresponds to tracepoint 800 while window 820 with its visualization (e.g., graph 825) corresponds to tracepoint 805. Consequently, a corresponding behavior visualization for each of the multiple different tracepoints is visualized on the user interface. Similar to before, these visualizations illustrate the logged behaviors associated with lines 8 and 12 of the code. In some embodiments, these visualizations are displayed simultaneously with one another as well as with the code, and in particular with the visualization's corresponding code portion (e.g., lines 8 and 12).

Figure 9:
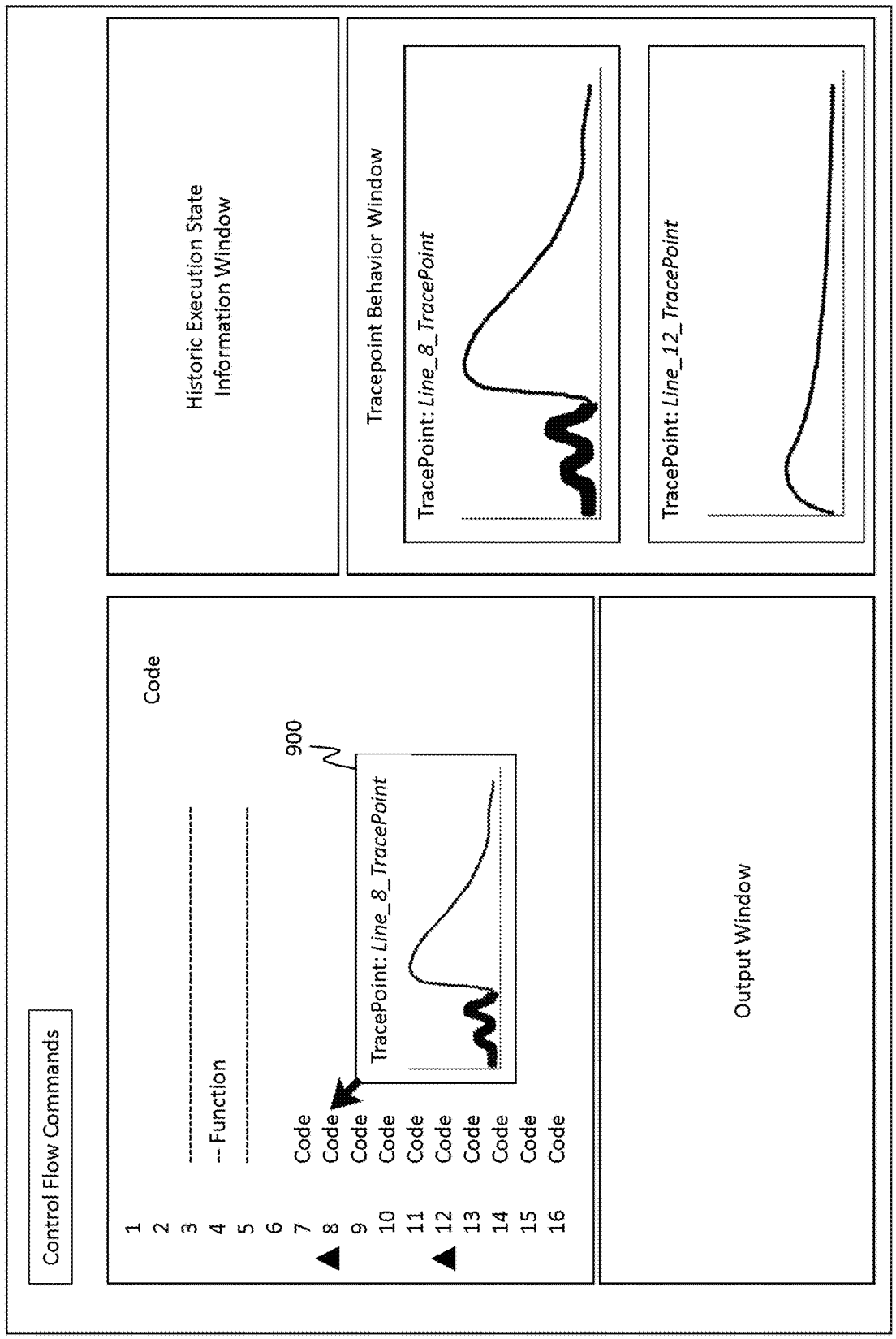
FIG. 9 shows an example hovering event in which a graphical visualization (of behavior) can appear when a cursor is hovered over a tagged code element, which has been tagged with a tracepoint.

FIG. 9 shows an example scenario in which a window 900 can be displayed in response to a cursor hovering over the tagged code portion, where the code portion is tagged as a result of a tracepoint being associated with that portion. Here, a cursor is hovering over line 8 of the code, where line 8 was previously associated with a tracepoint. In this embodiment, in addition to (or alternative to) the visualization being displayed in the tracepoint behavior window, the visualization can also be displayed in-line, or rather proximate to, the tagged code portion. Consequently, the visualization overlaps some of the code, while still allowing the tagged portion (e.g., line 8) to be visible.

Aggregating Multiple Sets of Historic Execution State Information

Figure 10:
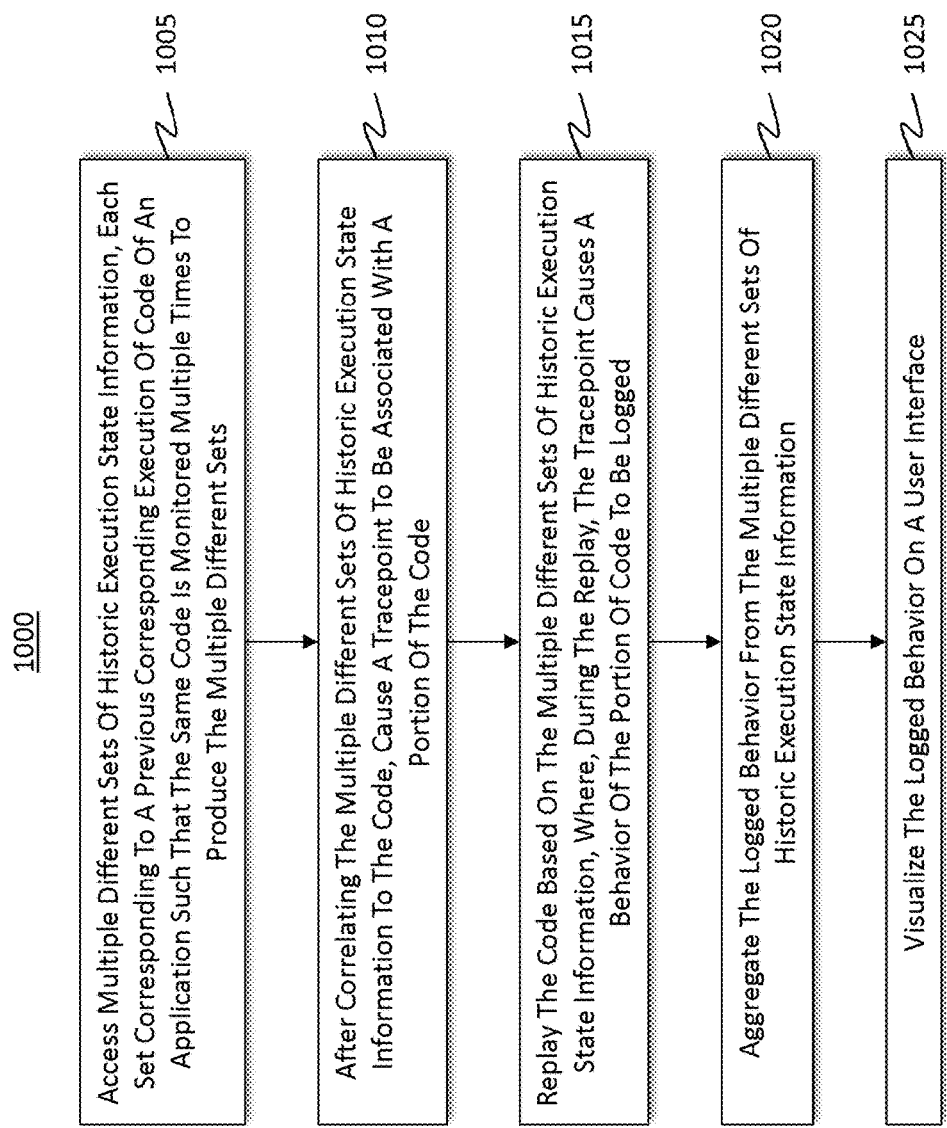
FIG. 10 illustrates a flowchart of an example method for aggregating multiple different sets of historic execution state information and for visualizing logged behavior based on those multiple different sets.

FIG. 10 illustrates a flowchart of an example method 1000 for aggregating multiple different sets of historic execution state information and for visualizing the aggregated data. For instance, with reference to FIG. 2A, it was previously discussed how an application can be executed or exercised any number of times and in any number of different environments. Consequently, any number of different sets of historic execution state information (e.g., 235 and 245 in FIG. 2A) may be generated. These different sets correspond to the same general body of code (i.e. the application's code), and, depending on how the application was exercised during a particular period, the different sets may correspond to at least some of the same specific portions of code (e.g., some of the same functions, modules, routines, or expressions). It is beneficial, therefore, to aggregate these different sets of historic execution state information to identify trends, patterns, or other characteristics/attributes embodied within the different sets.

Method 1000 initially includes an act 1005 of accessing multiple different sets of historic execution state information. Accordingly, in some embodiments, the historic execution state information is included in multiple different sets of historic execution state information, act 1005 includes accessing the multiple different sets of historic execution state information, where the multiple different sets of historic execution state information are all associated with the portion of code and with one or more other portions of code.

In some cases, each set corresponds to a previous corresponding execution of the application's code. As a result, the same general code is monitored multiple times, resulting in the generation of the multiple different sets. Such a scenario was discussed in connection with FIG. 2A. In some embodiments, the multiple different sets are all associated with the same portion of code. Additionally, each one of the multiple different sets may be associated with one or more other portions of code (e.g., different execution branches may have been exercised during the different executions). Therefore, in some embodiments, all of the different sets may share at least one (or more) commonality with one another in that at least one common function, line, or expression was executed during each of the previous executions. Additionally, in some embodiments, at least some of the multiple different sets of historic execution state information are recorded by different computer systems and/or at different time periods.

Method 1000 also includes an act 1010 where, after correlating the multiple different sets of historic execution state information to the code, as described earlier, a tracepoint is associated with a portion of the code. This operation is similar to that which was discussed earlier.

The code is then replayed based on the multiple different sets of historic execution state information (act 1015). During this replay operation, the tracepoint causes a behavior of the code portion to be logged.

In act 1020, the logged behavior is then aggregated together from the multiple different sets of historic execution state information. This operation will be described in more detail with reference to FIGS. 11-13. Additionally, in act 1025, the logged behavior is visualized on a user interface. In some embodiments, act 1025 includes, on the user interface, visualizing an aggregation of the multiple different sets of historic execution state information. In some embodiments, the logged behavior is visualized while the code is being replayed based on the historic execution state information such that one or more behavioral changes included within the logged behavior are rendered during said replaying. In some cases, the aggregation includes a code coverage indication of the multiple different sets of historic execution state information relative to the portion of code and relative to the one or more other portions of the code.

Figure 11:
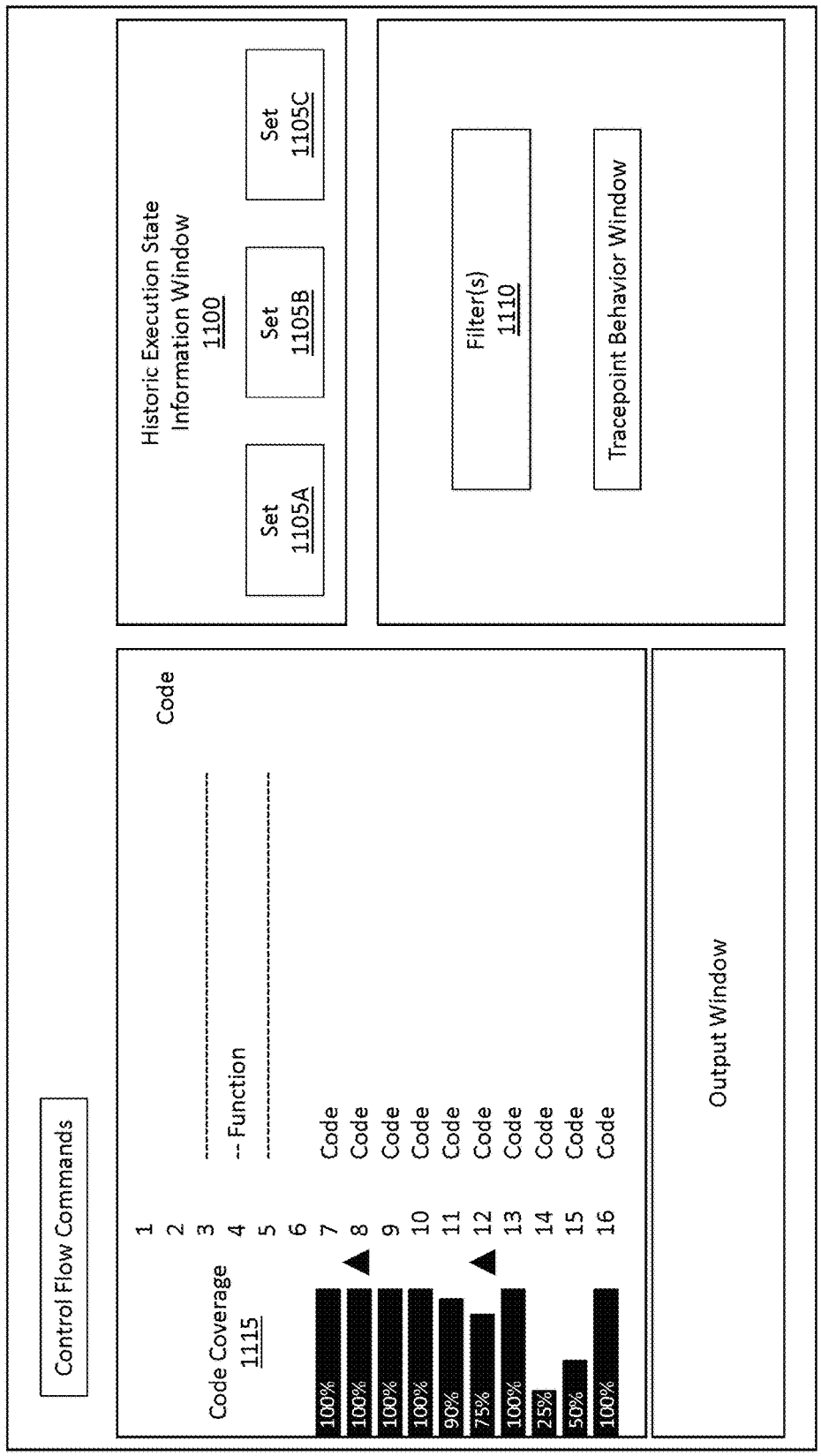
FIG. 11 shows an example user interface that may be used to visualize multiple different sets of historic execution state information, where the user interface also displays code coverage features for those different sets relative to the code.

Turning now to FIG. 11, a user interface is shown, where the user interface is somewhat similar to the earlier user interfaces. Here, however, the historic execution state information window 1100 now includes information for each of the different sets of historic execution state information that was accessed in method act 1005 of FIG. 10. For instance, set 1105A, set 1105B, and set 1105C are all displayed in the historic execution information window 1100. In some embodiments, these different sets may be displayed simultaneously with one another while in other embodiments different tabs are used to show the data, with one tab corresponding to one set or a linked group of related sets. As an example, a tab may display multiple sets, where each set may be related as a result of being performed on the same computing system, using a similar thread, executed during a same time period, or any of the other situations discussed in connection with FIG. 2C.

The user interface also includes one or more options to configure a filter 1110. Filter 1110 can be applied to the historic execution state information (e.g., any one or combination of the sets) to filter out at least some of the historic execution state information. The filter 1110 may be applied to individual sets (e.g., set 1105A, set 1105B, set 1105C), or it may be universally applied across all of the sets. In FIG. 11, no filter is currently being applied to the different sets of historic execution state information. Accordingly, in some embodiments, execution of computer-executable instructions further causes the computer system to apply a filter to the historic execution state information to filter out at least some of the historic execution state information.

The user interface also shows a code coverage indication 1115. Code coverage indication 1115 illustrates which lines in the code were executed during any of the previous executions. The code coverage indication 1115 also illustrates which percentage of those executions actually executed which specific lines of the code. In this regard, the code coverage 1115 can be considered as an aggregation of the multiple different sets of the historic execution state information.

For example, suppose the application was previously executed 1,000 times, thereby resulting in 1,000 different sets of historic execution state information. Of those 1,000 executions, an analysis of the historic execution state information may reveal that lines 7, 8, 9, 10, 13, and 16 of the code were executed in every one of the 1,000 execution runs. In contrast, line 11 was executed by only 90% of the 1,000 execution runs, line 12 was executed by only 75% of the 1,000 execution runs, line 14 was executed by only 25% of the 1,000 execution runs, and line 15 was executed by only 50% of the 1,000 execution runs. Consequently, the code coverage indication 1115 shows aggregate percentages detailing how often specific lines of the code were previously executed, as determined by analyzing the multiple different sets of historic execution state information.

Figure 12:
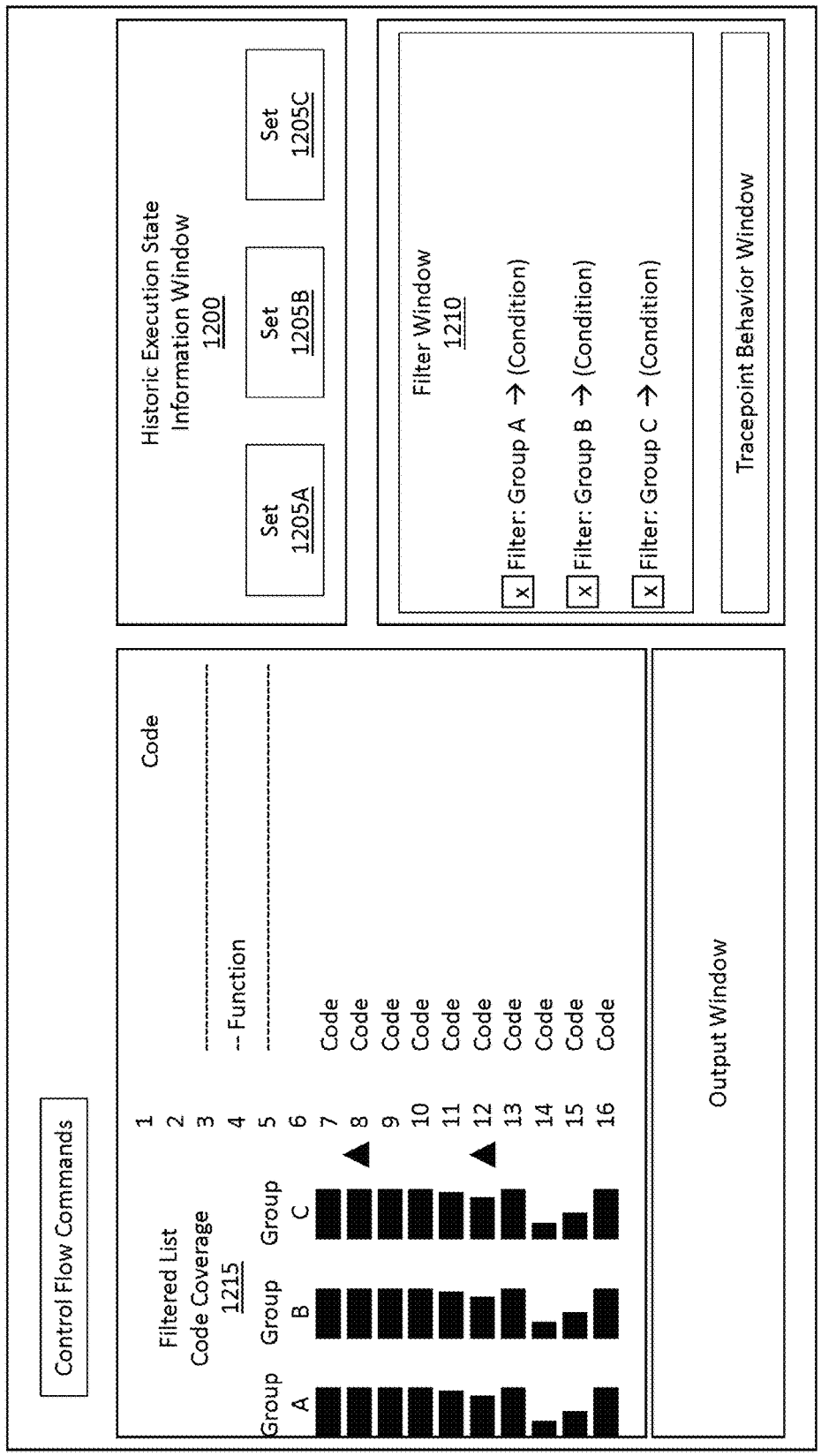
FIG. 12 shows an example of how filters can be applied to the multiple different sets of historic execution state information.

FIG. 12 shows a somewhat similar situation to that of FIG. 11, but now different filters have been applied to the code. For instance, similar to FIG. 11, FIG. 12 shows a historic execution state information window 1200 in which multiple different sets of historic execution state information may be displayed (e.g., sets 1205A, 1205B, and 1205C).

Here, the filter window 1210 now includes one or more filters. While only three filters are displayed, it will be appreciated that any number of filters may be provided, and the filters may cause different data to be filtered out of the historic execution state information.

The three filters have separated at least some of the multiple different sets of historic execution state information into three categories or groups (e.g., Group A, Group B, and Group C). Different criteria or parameters may be used to customize how the filtering occurs, and any number of filters or filtering parameters may be used.

As a result of at least some of the different sets of historic execution state information being filtered into three different groups, the user interface is now shown as displaying a filtered list code coverage 1215, with a list for Group A, a list for Group B, and a list for Group C. Similar to before, each list now shows a corresponding execution bar representative of execution percentages for each line of code. Although numeric percentage values are not illustrated, they can be if so desired. Furthermore, as opposed to an aggregated determination in which all of the multiple different sets are factored into the percentage values, in FIG. 12 only executions in each group are considered for each respective bar percentage visualization (i.e. three different bars are provided (one for each group) for line 7, 8, 9, etc. as opposed to a single bar for each line).

By checking (e.g., see the "x") or unchecking the boxes in the filter window 1210, a user can adjust which filters will be applied to the multiple different sets of historic execution state information. Furthermore, the user can customize the filters in any manner by defining any kind of filtering parameter or by adding/removing any number of filters. Filters can be saved and reused at any time or for any purpose. Accordingly, in some embodiments, execution of computer-executable instructions causes a computer system to apply one or more filters to the multiple different sets of historic execution state information to cause at least some of the multiple different sets of historic execution state information to be separated into different groupings based on parameters included within the one or more filters.

Figure 13:
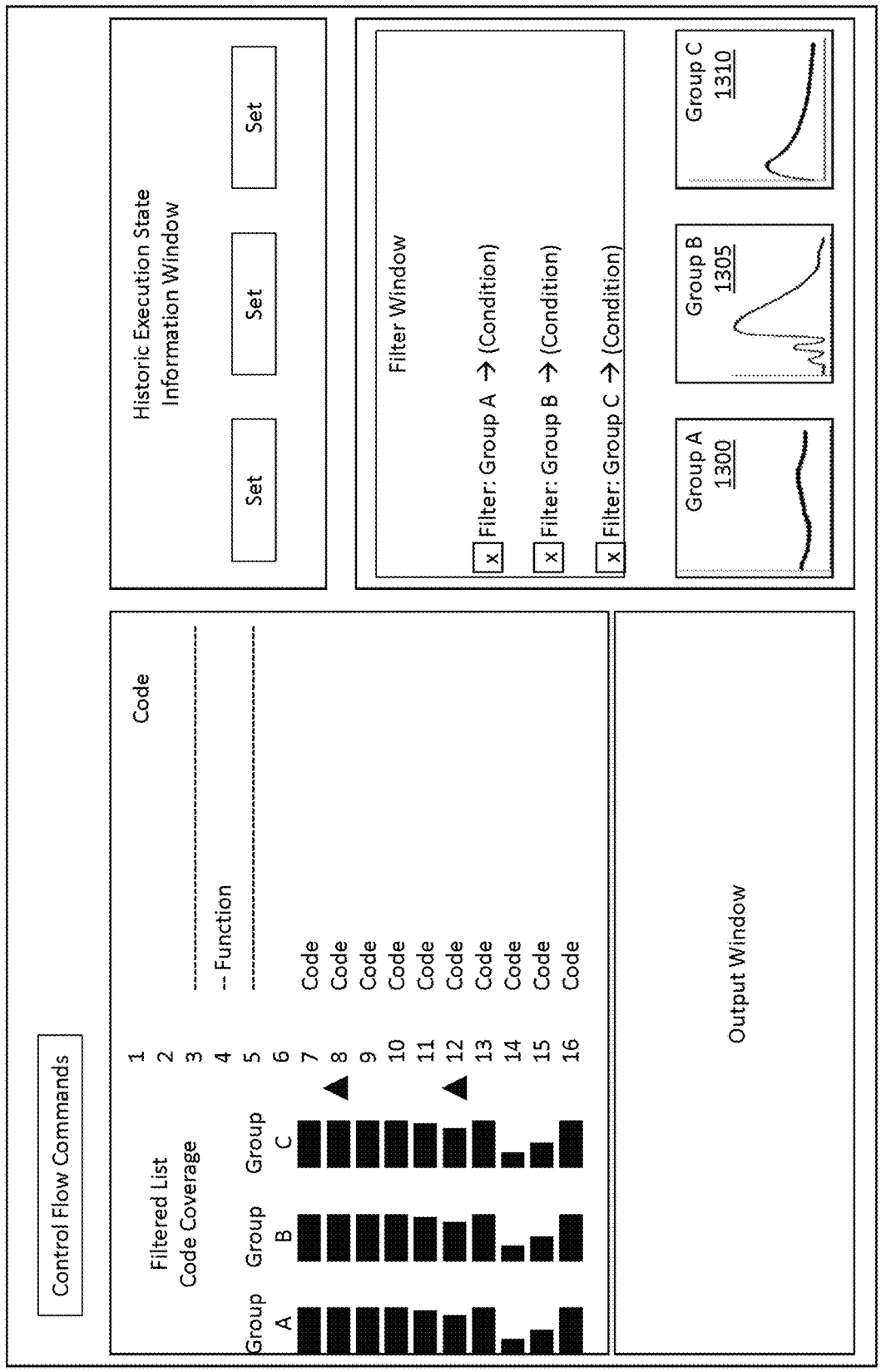
FIG. 13 shows an example of how a user interface is able to visualize tracepoint data for any number of the multiple different sets of historic execution state information.

FIG. 13 shows a scenario in which a behavioral visualization is being displayed for each one of the different groups discussed with respect to FIG. 12. In particular, FIG. 13 shows a first behavior visualization 1300 for Group A, a second behavior visualization 1305 for Group B, and a third behavior visualization 1310 for Group C. Each of these different visualizations (e.g., 1300, 1305, and 1310) may correspond to the same tracepoint (e.g., the tracepoint associated with line 8 of the code). Because the multiple different sets of historic execution state information are divided, or rather filtered, into different groupings, it follows that the logged behavior will be different for each group. Consequently, the graphs in each of the three visualizations 1300, 1305, and 1310 are different even though they correspond to the same tracepoint and to the same line of code.

Accordingly, the disclosed embodiments provide substantial benefits in the technical field of application code development, refinement, and debugging. By visualizing code behavior through the use of tracepoints, the disclosed embodiments provide significant benefits to an application developer and also help improve how a computer system functions.

Example System(s)

Figure 14:
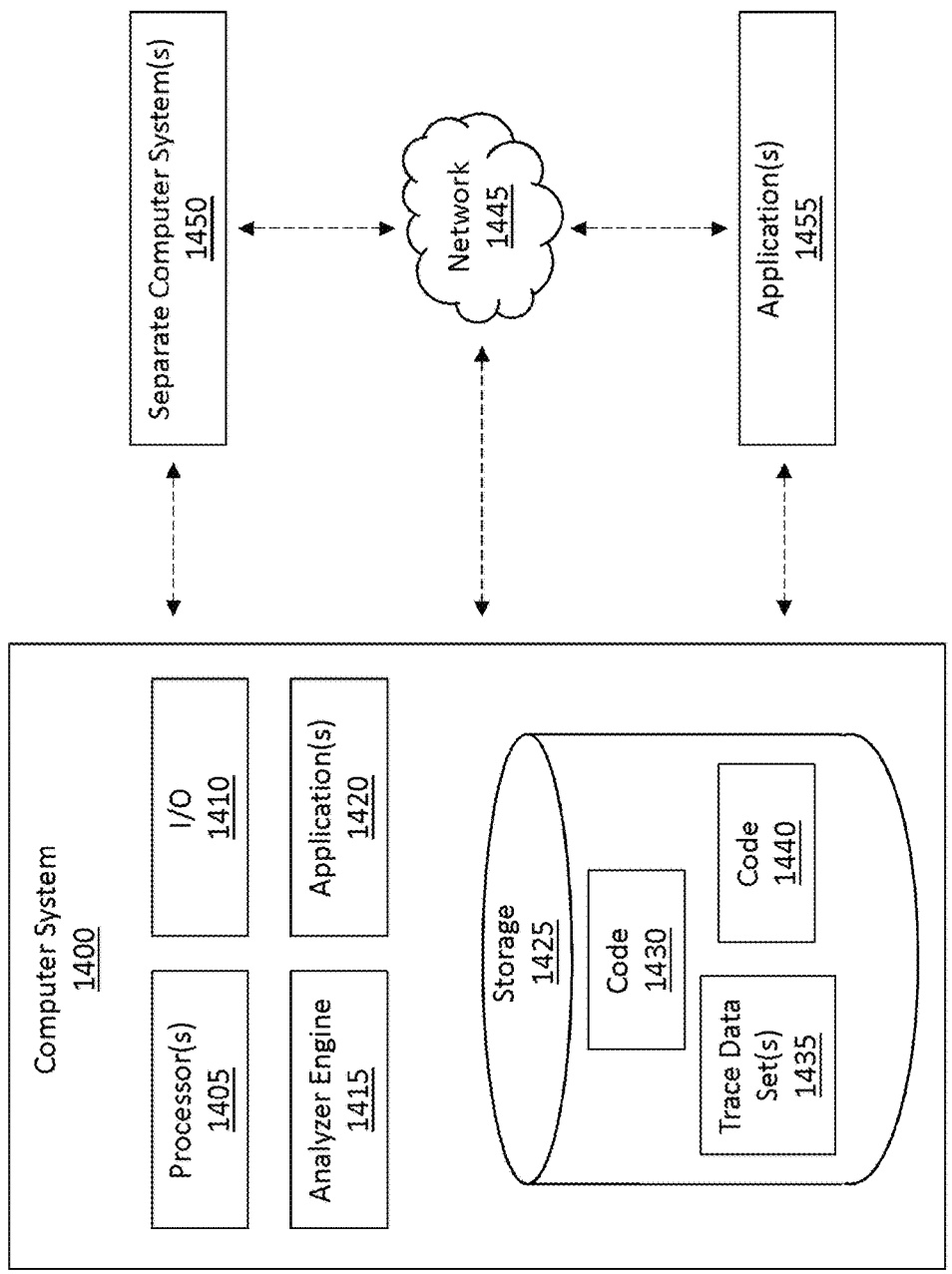
FIG. 14 illustrates an example computer system capable of performing any of the disclosed operations.

Attention will now be directed to FIG. 14 which illustrates an example computer system 1400 that may be used to facilitate the operations described herein. Computer system 1400 may take various different forms such as, for example, a tablet, a desktop, a distributed system that includes one or more connected computing components/devices that are in communication with computer system 1400, a laptop computer, a mobile phone, a server, a data center, and/or any other computer system.

In its most basic configuration, computer system 1400 includes various different components. For example, FIG. 14 shows that computer system 1400 includes at least one processor 1405 (aka a "hardware processing unit"), I/O 1410, an analyzer engine 1415, one or more application(s) 1420, and storage 1425.

The storage 1425 may include computer-executable instructions in the form of code 1430, any number of trace data sets 1435 (e.g., one or more sets of the historic execution state information), as well as code 1440 of the application(s) 1420. Storage 1425 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

As used herein, the term "executable module," "executable component," "engine," "model," or even "component" can refer to software objects, routines, or methods that may be executed on computer system 1400. The different components, models, modules, engines, and services described herein may be implemented as objects or processors that execute on computer system 1400 (e.g. as separate threads). It will be appreciated that engines, modules, models, or components may be a combination of one or more processors and executable instructions that cause the processor(s) to perform specialized functions, such as those described throughout this disclosure and in particular with relation to each individual method act described in FIG. 1 and/or FIG. 10.

In other instances, the components, modules, models, or engines may simply be executable instructions that are executable by any type of processor. In yet other instances, the components, modules, models, or engines, may be in the form of ASICs or even system-on-chip ("SOC") devices specially configured to perform any individual operation (e.g., any one act included in the methods from FIG. 1 or 10) or to perform multiple operations (e.g., any combination of the method acts from FIG. 1 or 10). In this regard, a component, module, model, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor 1405) and system memory (such as storage 1425), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras, accelerometers, gyroscopes, acoustic sensors, magnetometers, data acquisition systems, etc.). Further, computer system 1400 may also be connected through one or more wired or wireless networks 1445 to remote/separate computer systems(s) 1450 that are configured to perform any of the processing described with regard to computer system 1400 or that are configured to execute applications and acquire corresponding sets of historic execution state information. Additionally, or alternatively, computer system 1400 is able to acquire information from any number of external applications 1455, either directly or indirectly via the network 1445.

I/O 1410 devices include any type of input/output device such as, but not limited to, displays, keyboards, mice, etc. I/O 1410 also includes any number of visualization engines (e.g., display graphics or a graphics rendering engine) that may be configured, with processor 1405 and/or with one or more GPUs, to render one or more images for a user (e.g., the user interfaces discussed previously). The analyzer engine 1415 can be a specialized processing unit configured to perform any of the disclosed operations. Alternatively, the processor 1405 can be configured to perform the disclosed operations.

A "network," like the network 1445 shown in FIG. 14, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1445. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

It will also be appreciated that computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1405). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to:
   access historic execution state information corresponding to a previous execution of an application, wherein the historic execution state information was collected during the previous execution of the application;
   after correlating the historic execution state information to code associated with the application, cause a tracepoint to be associated with a value of a variable at a particular point of the code, wherein when the code of the application is replayed based on the historic execution state information, the tracepoint causes the value of the variable associated with the tracepoint to be logged without pausing or interrupting the replay of the code;
   replay the code based on the historic execution state information, wherein during the replay, the tracepoint causes the value of the variable at the particular point of code to be logged without pausing or interrupting the replay of the code; and
   on a user interface, visualize the logged value of the variable.

2. The computer system of claim 1, wherein the historic execution state information includes information for only a portion of the application's execution as opposed to an entirety of the application's execution.

3. The computer system of claim 1, wherein the tracepoint is associated with the point of code after the application's previous execution such that the value of the variable is logged and visualized only after the application's previous execution.

4. The computer system of claim 1, wherein the tracepoint is configurable such that the logged value of the variable is organized by any one or more of hardware component, software component, machine, thread, or time.

5. The computer system of claim 1, wherein replaying the code based on the historic execution state information is a read-only operation performed by reading the historic execution state information.

6. The computer system of claim 1, wherein a tracepoint icon is displayed at a location proximate to the point of the code, and wherein the tracepoint icon has a format that is different from a breakpoint icon.

7. The computer system of claim 1, wherein the point of the code corresponds to a string value, and wherein visualizing the logged value of the variable of the code is performed by visualizing the string value as an object or, alternatively, as a string literal.

8. The computer system of claim 1, wherein execution of the computer-executable instructions further causes the computer system to:
   apply a filter to the historic execution state information to filter out at least some of the historic execution state information.

9. The computer system of claim 1, wherein the historic execution state information comprises at least one of time travel diagnostic data or data acquired from a memory dump.

10. The computer system of claim 1, wherein the historic execution state information was collected while the application was in at least one of a deployed state or a development state.

11. A method for using historic execution state information to visualize tracepoint data, the method being implemented by a computer system and comprising:
   accessing historic execution state information corresponding to a previous execution of an application, wherein the historic execution state information was collected during the previous execution of the application;
   after correlating the application's historic execution state information to code associated with the application, causing a tracepoint to be associated with a value of a variable at a particular point of the code, wherein when the code of the application is replayed based on the historic execution state information, the tracepoint causes the value of the variable associated with the tracepoint to be logged without pausing or interrupting the replay of the code;
   replaying the code based on the historic execution state information, wherein during the replay, the tracepoint causes the value of the variable at the particular point of the code to be logged without pausing or interrupting the replay of the code; and
   on a user interface, visualizing the logged value of the variable.

12. The method of claim 11, wherein visualizing the logged value of the variable includes graphing the logged value of the variable over a determined period of time.

13. The method of claim 11, wherein the logged value of the variable is visualized while the code is being replayed based on the historic execution state information such that one or more behavioral changes included within the logged value of the variable are rendered during said replaying.

14. The method of claim 11, wherein multiple different tracepoints are associated with multiple different corresponding portions of the code, and
   wherein a corresponding behavior visualization for each tracepoint in the multiple different tracepoints is visualized on the user interface.

15. The method of claim 11, wherein the user interface includes one or more playback controls, and
   wherein the one or more playback controls, when implemented, control how the logged value of the variable is visualized.

16. One or more hardware storage devices having stored thereon computer-executable instructions that are executable by one or more processors of a computer system to cause the computer system to:
   access historic execution state information corresponding to a previous execution of an application, wherein the historic execution state information was collected during the previous execution of the application;
   after correlating the application's historic execution state information to code associated with the application, cause a tracepoint to be associated with a value of a variable at a particular point of the code, wherein when the code of the application is replayed based on the historic execution state information, the tracepoint causes the value of the variable associated with the tracepoint to be logged without pausing or interrupting the replay of the code;

replay the code based on the historic execution state information, wherein, during the replay, the tracepoint causes the value of the variable at the particular point of the code to be logged without pausing or interrupting the replay of the code; and on a user interface, visualize the logged value of the variable.

17. The one or more hardware storage devices of claim 16, wherein the historic execution state information is included in multiple different sets of historic execution state information, and wherein execution of the computer-executable instructions further causes the computer system to:

access the multiple different sets of historic execution state information, wherein the multiple different sets of historic execution state information are all associated with the point of the code and with one or more other points of the code; and on the user interface, visualize an aggregation of the multiple different sets of historic execution state information.

18. The one or more hardware storage devices of claim 17, wherein the aggregation includes a code coverage indication of the multiple different sets of historic execution state information relative to the point of code and relative to the one or more other points of the code.

19. The one or more hardware storage devices of claim 17, wherein execution of the computer-executable instructions further causes the computer system to:

apply one or more filters to the multiple different sets of historic execution state information to cause at least some of the multiple different sets of historic execution state information to be separated into different groupings based on parameters included within the one or more filters.

20. The one or more hardware storage devices of claim 17, wherein at least some of the multiple different sets of historic execution state information are recorded by different computer systems.

* * * * *